United States Patent
Nemoto et al.

(10) Patent No.: US 6,815,083 B2
(45) Date of Patent: Nov. 9, 2004

(54) PERPENDICULAR MAGNETIC RECORDING MEDIUM AND PROCESS OF PRODUCTION THEREOF

(75) Inventors: Hiroaki Nemoto, Kokubunji (JP); Hiroyuki Nakagawa, Yokohama (JP); Yuzuru Hosoe, Hino (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 10/217,478

(22) Filed: Aug. 14, 2002

(65) Prior Publication Data

US 2003/0162041 A1 Aug. 28, 2003

(30) Foreign Application Priority Data

Feb. 26, 2002 (JP) .................................. P2002-048937

(51) Int. Cl.$^7$ .......................... G11B 5/673; B05D 3/00
(52) U.S. Cl. ...................... 428/611; 428/637; 428/670; 428/678; 428/216; 428/336; 428/694 TS; 428/694 TM; 427/128; 427/130; 427/131
(58) Field of Search ...................... 428/611; 427/128, 427/130, 131, 637, 669, 670, 678, 213, 216, 336, 694 TS, 694 TM

(56) References Cited

U.S. PATENT DOCUMENTS

| | | | |
|---|---|---|---|
| 4,587,176 A | | 5/1986 | Carcia |
| 4,678,721 A | | 7/1987 | Den Broeder et al. |
| 5,106,703 A | | 4/1992 | Carcia |
| 5,400,307 A | * | 3/1995 | Ochiai et al. ............ 369/13.35 |
| 5,660,930 A | * | 8/1997 | Bertero et al. ............. 428/332 |
| 5,750,270 A | * | 5/1998 | Tang et al. ................. 428/611 |
| 6,083,599 A | * | 7/2000 | Hirayama et al. ......... 428/65.3 |
| 6,524,730 B1 | * | 2/2003 | Chen ................... 428/694 TM |
| 2002/0086184 A1 | * | 7/2002 | Wu et al. ............ 428/694 TM |
| 2002/0101692 A1 | * | 8/2002 | Fullerton et al. ........ 360/324.2 |

FOREIGN PATENT DOCUMENTS

| | | | |
|---|---|---|---|
| JP | 05189738 A | * | 7/1993 |
| JP | 11-501755 | | 2/1996 |
| WO | WO 96/24927 | | 2/1996 |

OTHER PUBLICATIONS

English Translation of JP '05-189738-A (PTO Doc. 03-4034).*

(List continued on next page.)

*Primary Examiner*—Kevin M. Bernatz
(74) *Attorney, Agent, or Firm*—Reed Smith LLP; Stanley P. Fisher, Esq.; Juan Carlos A. Marquez, Esq.

(57) ABSTRACT

A perpendicular magnetic recording medium, which has a low level of recording noise and sufficiently large perpendicular magnetic anisotropy energy relative to demagnetizing field energy, includes a substrate and a multi-layered magnetic film. The multi-layered magnetic film is composed of ferromagnetic metal layers of Co alloy containing at least Cr and non-magnetic metal layers of Pd alloy, each one layer of which are laminated alternately on top of one layer of the other. The ferromagnetic metal layers and the non-magnetic metal layers have a thickness of d1 and d2, respectively, with the ratio of d1/d2 being in the range of 1.5 to 4.0. This specific layer structure reduces the magnetic exchange interaction between magnetic particles in the multi-layered magnetic film. Therefore, the perpendicular magnetic recording medium is stable against thermal disturbance and has a low level of recording noise.

16 Claims, 8 Drawing Sheets

OTHER PUBLICATIONS

JPO Abstract Translation of JP 05-189738-A (Doc. ID: JP 05189738 A).*

Sato, A., Hatakeyama, M., Nakagawa, S., and Naoe, M., IEEE Trans. Mag., 35(5), 1999, 2742-2744.*

Bruce M. Lairson, Jessie Perez and Chandler Baldwin, "Application of Pd/Co Multilayers for Perpendicular Magnetic Recording", Appl. Phys. Lett 64 (21), May 23, 1994, pp. 2891-2893.

Hisashi Takano, Yasutaka Nishida, Masaaki Futamoto, Hajime Aoi and Yoshihisa Nakamura, "Possibilities of 40 Gb/in$^2$ Perpendicular Recording", IEEE 2000, p. Ad-06.

HJG Draaisma, WJM de Jonge and FJA den Broeder, "Magnetic Interface Anisotropy in Pd/Co and Pd/Fe Multilayers", Journal of Magnetism and Magnetic Materials 66 (1987), pp. 351-355.

* cited by examiner

FIG. 2
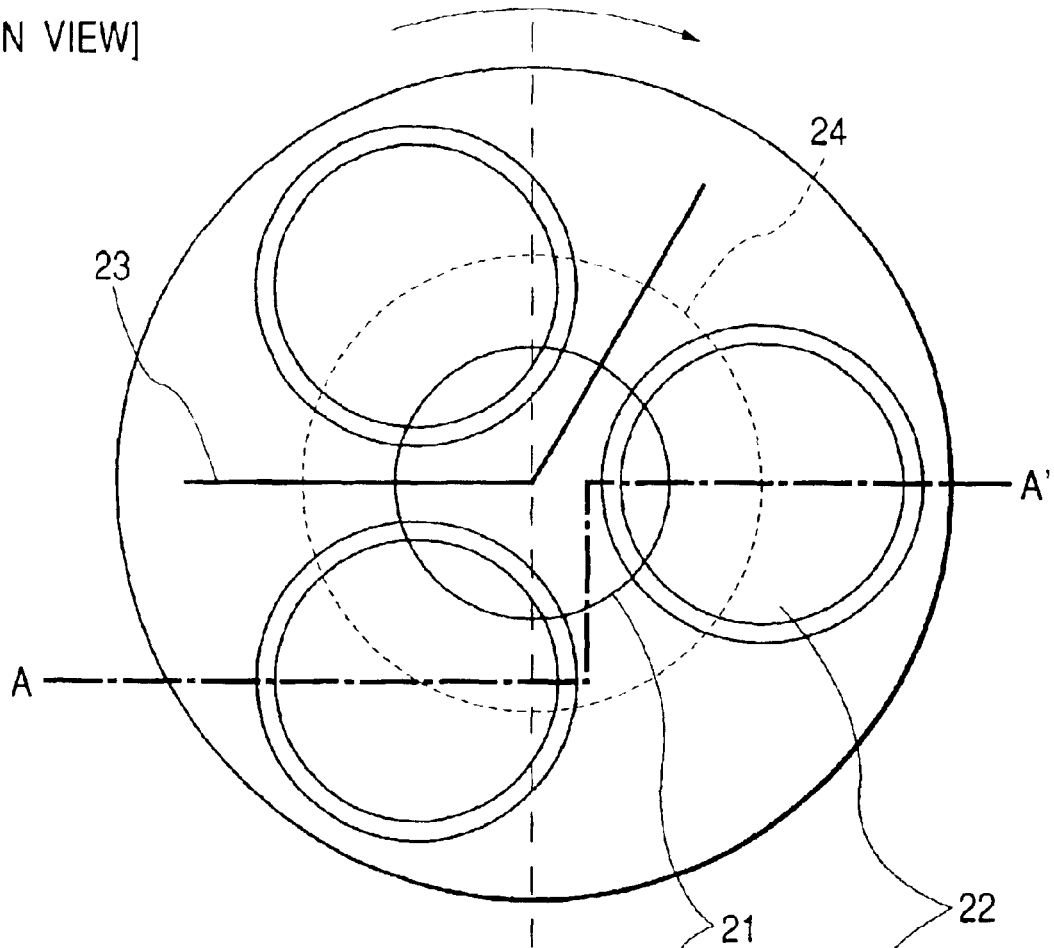
CATHODE ROTATION DIRECTION
[PLAN VIEW]
[SECTIONAL VIEW ALONG A-A']
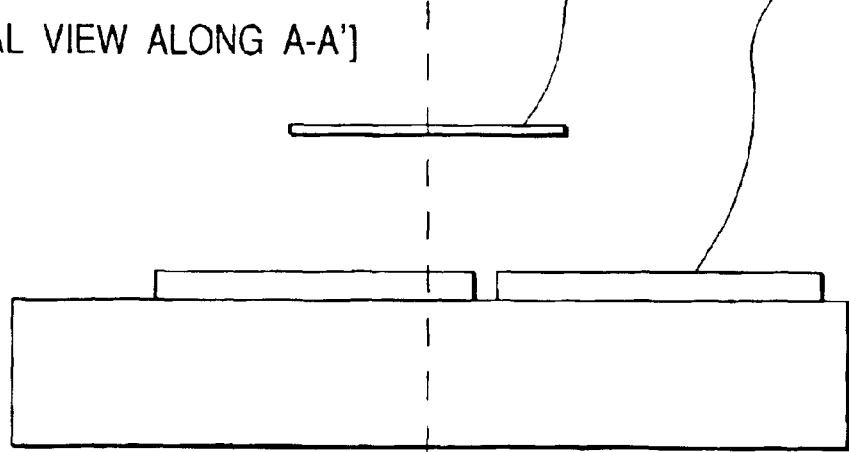

SPUTTERING METHOD

POSITION IN TANGENTIAL DIRECTION ($\theta$)

ALTERNATE DISCHARGING METHOD

POSITION IN TANGENTIAL DIRECTION ($\theta$)

PERPENDICULAR MAGNETIC RECORDING MEDIUM AND PROCESS OF PRODUCTION THEREOF

BACKGROUND OF THE INVENTION

1. Field of the Invention

The present invention relates to a perpendicular magnetic recording medium which comprises a substrate and a multi-layered magnetic film composed of ferromagnetic metal layers and non-magnetic metal layers which are laminated alternately on top of the other.

2. Description of Related Arts

The recent advance in information society demands data recording apparatus, such as hard disk drive ("HDD" hereinafter), with higher performance. Improving the performance of HDD is synonymous with increasing the recording density. One promising technology to meet this demand is the perpendicular magnetic recording system which magnetizes the medium perpendicularly to the film plane, rather than in the plane. There are several candidates as the magnetic material for the recording layer of the perpendicular magnetic recording medium. Among them are CoCr-based alloys incorporated with Pt, Ta, B, etc. as additives, which have been investigated most closely.

A recording medium of CoCr-based alloy is superior in recording characteristics, but CoCr-based alloy itself has insufficient perpendicular magnetic anisotropy energy ($K_u$) which holds the magnetization in its orientation. For this reason, CoCr-based alloy gives an M-H curve with a squareness ratio much smaller than 1 and permits small reversed magnetic domains to appear in magnetic recording domains, thereby reducing the strength of reproduced signals. Even though its M-H curve has a squareness ratio close to 1, CoCr-based alloy is still susceptible to "thermal signal loss" which is a phenomenon that the state of magnetization changes after recording due to thermal disturbance.

To cope with this situation, there has been proposed a recording medium in which the recording layer is a multi-layered film composed of thin films (with a thickness of an atomic order) laminated alternately on top of the other. This recording layer can be designed such that the magnetic structure formed by the magnetic head remains unchanged with time owing to its sufficiently large value of $K_u$.

The structure of the multi-layered film mentioned above is generally referred to as superlattice structure. It takes on a variety of physical properties owing to the state peculiar to the interface between atomic layers. It is known that the magnetic thin film of multi-layered structure has a large perpendicular magnetic anisotropy energy if it is formed from ferromagnetic metal (such as Co and Fe) and noble metal (such as Pd, Pt, and Au) laminated alternately. This multi-layered structure of ferromagnetic metal and noble metal is used in the perpendicular magnetic recording medium disclosed in U.S. Pat. Nos. 4,587,176, 4,678,721, and 5,106,703.

Unfortunately, the magnetic recording medium with the magnetic thin film mentioned above has a larger recording noise than the perpendicular recording medium of CoCr-based alloy. In other words, it is not necessarily superior in recording properties. The cause of recording noise arises from the reversal mechanism of the multi-layered magnetic film as has been pointed out in many studies.

The fact that CoCr-based alloy thin film is capable of low-noise recording is because there exist ferromagnetic fine particles in the film, with each particle being magnetically isolated by a phase with rich Cr which has spread out on its periphery. By contrast, the multi-layered magnetic film, which takes no special effort to form the fine structure in the magnetic film, permits magnetization reversal to take place in a large area as a unit. Therefore, the magnetic domain for recording has a zigzag contour regardless of the distribution of the magnetic field applied by the recording head. This zigzag contour reflects the random distribution of the magnetic properties of the magnetic film, and hence it brings about recording noise. To address the problem involved with the multi-layered magnetic film, comprehensive studies have been made on a variety of additives and underlying materials.

Attempts have been made to use a multi-layered magnetic film of Co and Pd or Pt as a magnetic recording medium. Its composition, structure, and manufacturing method intended for better recording characteristics are disclosed in Toku-Hyo-Hei 11-501755 (Japanese translation of PCT international publication WO96/24927) According to this disclosure, each magnetic metal layer is made of Co or Co alloy with a thickness of 0.15–1.0 nm and a noble metal layer with a thickness of 0.5–1.5 nm. The number of the magnetic metal layers, each including one noble metal layers, is 10–30. The magnetic recording medium of this structure has a coercive force larger than 2.5 kOe. In addition, according to the disclosure, the multi-layered magnetic film and its nuclei-forming layer (such as Pd) should have a total thickness smaller than 150 nm so as to avoid an unnecessarily large space between the recording head and the backing soft magnetic layer (NiFe).

Moreover, an effective way of reducing the noise of recording medium is also disclosed in the patent publication just mentioned above. The disclosure mentions that the recording film should be made by sputtering with an oxygen-containing sputtering gas at a reduced degree of vacuum and at a high sputtering gas pressure, and annealing should be performed before and after the film forming step. The disclosure further mentions that it is possible to reduce the recording noise if the Co alloy layer is formed from CoCr or CoCrTa.

Another perpendicular magnetic recording medium with a multi-layered magnetic film of Pd/CoCr is disclosed in Appl. Phys. Lett. 64 (21) pp. 2891–2893 by B. M. Lairson et. al. This thesis deals with how the recording characteristics vary depending on the thickness of the CoCr layer and the amount of Cr added. With the thickness of the Pd layer fixed at 0,4 nm, it concludes that the recording characteristics are satisfactory if the content of Cr is about 15 at %.

The present inventors repeated the procedure mentioned in the foregoing patent publication (11-501755) to reproduce the sample No. 12 given in page 22. This sample is a multi-layered magnetic recording film composed of ferromagnetic layers of CoCr-based alloy and noble metal layers which are laminated alternately on top of the other. The recording film is of superlattice structure consisting of CoCr layers (0.35 nm) and Pd layers (1.0 nm), with a Pd underlying layer (20 nm). The CoCr-based alloy contains 12 at % Cr. The reproduced sample was actually tested for recording and reproducing performance. The test results indicate that the sample is stable to thermal disturbance but is not particularly superior to the conventional CoCrPt recording medium (proposed by Takano et al., Digest of Intermag 2000, AD-06).

The recording medium reproduced by the present inventors has a higher level of recording noise than the CoCrPt medium (just mentioned above) despite incorporation with Cr. A probable reason for this is that magnetic exchange interaction between particles is not sufficiently reduced. On the other hand, the magnetic film has a greatly decreased level of saturation magnetization (~100 kA/m) because the CoCr-based alloy contains 12 at % Cr. This results in a significant decrease in reproduced signal intensity. It was found that the S/N ratio of the reproduced recording medium is lower by 10 dB or less than that of the conventional CoCrPt recording medium, when measured with the same recording/reproducing head due to the increased noise (N) and the decreased signal (S).

The reason why the reproduced recording signal shows the sufficiently low recording noise is that Cr in the ferromagnetic layer of CoCr-based alloy does not fully block magnetic exchange interaction between magnetic fine particles. The laminate structure disclosed in the above-mentioned patent publication (11-501755) is characterized in that the ferromagnetic layer of CoCr-based alloy (of 0.35 nm thick) is relatively thinner than the noble metal (Pd) layer (of 1.0 nm thick). This thickness ratio is inadequate to reduce the magnetic exchange interaction between magnetic particles to such an extent as to suppress recording noise because there exists the magnetic exchange interaction between particles also in the Pd alloy layer due to magnetization induced in the Pd alloy layer by the ferromagnetic layer of CoCr-based alloy. In addition, the small saturation magnetization is apparently due to the excessively thin ferromagnetic layer of CoCr-based alloy.

However, the above-mentioned report by Lairson et al. shows (in FIG. 5) how the perpendicular magnetic anisotropy energy ($K_u$) depends on the thickness of the CoCr-based alloy layer. It is shown that the $K_u$ value decreases with the increasing thickness of CoCr layer to such an extent that it is not useful for the magnetic recording medium. Moreover, in the above-mentioned report, the $K_u$ value is merely a little over $1 \times 10_5$ J/m$^3$ (FIG. 4) in the case of a multi-layered magnetic film composed of Pd layers (0.4 nm thick) and CoCr layers (0.2 nm thick) containing 15 at % Cr, which gave comparatively good results in recording and reproducing experiments. The reason for this small $K_u$ is the insufficient surface magnetic anisotropy energy ($K_s$) The foregoing suggests that the magnetic layer for recording cannot be applied in the practical perpendicular magnetic recording system simply because its axis of magnetization is perpendicular to the magnetic recording medium. Tackling this problem motivated the present invention. Accordingly, it is an object of the present invention to provide a perpendicular magnetic recording medium characterized by reduced recording noise such that the magnetic particles become less susceptible thermal disturbance.

SUMMARY OF THE INVENTION

In order to achieve the above-mentioned object, the present inventors studied the magnetic recording medium having a multi-layered magnetic film composed of ferromagnetic metal layers containing Co and non-magnetic metal layers containing Pd which are laminated alternately on top of the other. The result suggests that it is possible to obtain a perpendicular magnetic recording medium exhibiting sufficient perpendicular magnetic anisotropy energy with the recording noise reduced below a certain level, if the multi-layered magnetic film has a specific composition and layer structure and is produced under specific conditions.

The present invention is based on this finding. Thus, the gist of the present invention resides in a perpendicular magnetic recording medium having a substrate and a multi-layered magnetic film formed thereon with or without an underlying layer interposed between them. The multi-layered magnetic film is composed of ferromagnetic metal layers containing Co and non-magnetic metal layers containing Pd which are laminated alternately on top of the other, characterized in that the ratio of film thickness defined by d1/d2 ranges from 1.5 to 4.0, where d1 denotes the thickness of each of said ferromagnetic metal layers and d2 denotes the thickness of each of said non-magnetic metal layers which is between 0.6 nm and 2.0 nm (0.6 nm <d2 <2.0 nm).

The perpendicular magnetic recording medium constructed as mentioned above may be modified such that the ferromagnetic metal layers are formed from CoCr-based alloy. The resulting multi-layered magnetic film has a low level of recording noise due to the reduction in magnetic exchange interaction between magnetic particles and also has good resistance to thermal disturbance due to the sufficient perpendicular magnetic anisotropy energy to resist the demagnetizing field energy induced by magnetization of the magnetic film.

The gist of the present invention resides also in a process for producing the perpendicular magnetic recording medium, which comprises a step of forming a first underlying layer on a substrate which may contains, ex. Pd, a step of forming a second underlying layer which may contains, ex. $CoCr_{40}$, then a multi-layered magnetic film composed of alternately laminated ferromagnetic metal layers containing Co and non-magnetic metal layers containing Pd.

The above-mentioned process is preferably modified such that an initial layer containing a paramagnetic Co alloy interposed between the underlying layer and the multi-layered magnetic film. In addition, the step of forming the multi-layered magnetic film is preferably followed by heat treatment in a vacuum at a temperature higher than 350° C.

BRIEF DESCRIPTION OF THE DRAWINGS

A preferred embodiment of the present invention is illustrated in the accompanying drawings in which:

FIG. 2 is a diagram of a ternary rotary cathode device;

DESCRIPTION OF THE PREFERRED EMBODIMENTS

Figure 1A:
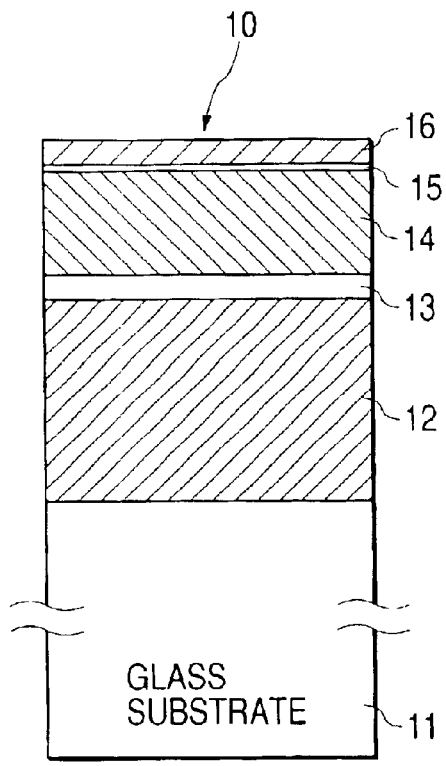
FIG. 1 is a cross-sectional view of the magnetic recording medium to which the present invention is applied.

As shown in FIG. 1(a), the perpendicular magnetic recording medium 10 according to the present invention consists of a glass substrate 11, an underlying layer 12 of $NiTa_{37}Zr_{10}$ alloy, an underlying layer 13 of Pd, a multi-layered magnetic film 14, a Pd cap layer 15, and a carbon protective layer 16. (Subscripts indicate at %.) The multi-layered magnetic film 14 is composed of ferromagnetic metal layers 14-1 and non-magnetic metal layers 14-2 each one layer of which is alternately laminated on top of one layer of the other kind. This perpendicular magnetic recording medium differs from the sample used for evaluation of recording and reproducing which has a soft magnetic backing layer (400 nm thick) between the glass substrate 11 and the underlying layer 12. However, there is no difference between them in the magnetic characteristics of the multi-layered magnetic film.

Figure 1B:
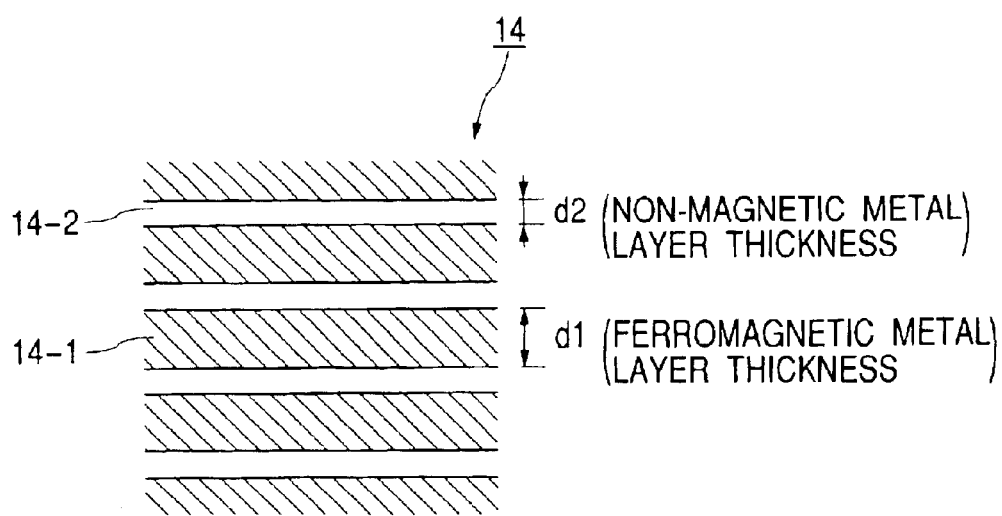

The multi-layered magnetic film 14 shown in FIG. 1(b) is composed of ferromagnetic metal layers 14-1 and non-magnetic metal layers 14-2. The former are formed from CoCr-based alloy, and the latter are formed from Pd alloy. The multi-layered magnetic film 14 is characterized in that the ratio of d1/d2 ranges from 1.5 to 4.0, where d1 denotes the thickness of each of the ferromagnetic metal layers and d2 denotes the thickness of each of the non-magnetic metal layers.

To incorporate with Cr to reduce magnetic exchange interaction between particles, the ferromagnetic metal layers of CoCr-based alloy ("CoCr-based alloy layers" hereinafter) should be thicker than the non-magnetic metal layers of Pd alloy ("Pd alloy layers" hereinafter) so that the grain boundary with a high Cr concentration produces a strong effect. Specifically, the ratio of d1/d2 should range from 1.5 to 4.0, where d1 denotes the thickness of each of the ferromagnetic metal layers and d2 denotes the thickness of each of the non-magnetic metal layers.

The multi-layered film structure in the perpendicular magnetic recording medium 10 exhibits the interface magnetic anisotropy $K_s$ and increases the perpendicular magnetic anisotropy energy $K_u$ only when the thickness d2 of the Pd alloy layer is 0.6 nm or larger. If the Pd alloy layer is excessively thin, the surface magnetic anisotropy becomes small despite the multi-layered film structure. If the Pd alloy layer is excessively thick, magnetic exchange interaction between CoCr-based alloy layers may be insufficient and individual layers may have different coercive force. Therefore, the thickness of the Pd alloy layer should be 2.0 nm or less. Thus the thickness of the Pd alloy layer should be in the range of 0.6 nm to 2.0 nm, preferably 0.8 nm to 1.2 nm.

The ratio of d1/d2 should be in the range of 1.5 to 4.0. If the ratio of d1/d2 is smaller than 1.5, there is large magnetic exchange interaction between particles and large domain wall displacement at the time of recording, which lead to large recording noise. If the ratio of d1/d2 is larger than 4.0, the thickness of each of the ferromagnetic metal layers is large and the effect of increasing perpendicular magnetic anisotropy energy by $K_s$ become negligible. Thus, the multi-layered film structure will not improve thermal stability.

In the case of magnetic recording medium with a multi-layered film composed of CoCr-based alloy layers and noble metal layers which are laminated alternately, it has been common practice to reduce the laminating period (λ) so as to increase the surface magnetic anisotropy energy $K_s$ induced by the layer interfaces.

Under the condition specified by the thickness ratio of d1/d2, the value of λ is inevitably large and hence the crystal magnetic anisotropy energy $K_v$ of each CoCr-based alloy layer accounts for a larger portion in the total perpendicular magnetic anisotropy energy $K_u$ of the multi-layered magnetic films. Therefore, $K_s$ merely enhances $K_u$, and it is essential that each CoCr-based alloy layer has a large value of $K_v$. Therefore, it is necessary to produce the multi-layered structure to obtain a high value of $K_v$.

One way to increase the value of $K_v$ is to keep as low as possible the Cr concentration in the CoCr-based alloy layer. Unfortunately, reducing the Cr concentration in CoCr-based alloy generally tends to weaken the effect of reducing the magnetic exchange interaction between particles at the Cr grain boundary. (This is also applicable to monolayer CoCr-based alloys.) Up to now, a Cr concentration of 20% is the minimum amount to reduce the magnetic exchange interaction between particles and to suppress the recording noise.

However, the present inventors found that it is possible to sufficiently reduce the magnetic exchange interaction between particles in the multi-layered magnetic film 14 even though the Cr concentration is reduced below 20% in the CoCr-based alloy layer, if the following production process is adopted.

(1) On the underlying layer formed an initial layer (about 3 nm thick) of paramagnetic CoCr-based or CoCu.
(2) On the initial layer is formed the multi-layered magnetic film 14.
(3) After the multi-layered magnetic film 14 has been formed, heat treatment is performed at 350° C. or above for about 10 seconds.

It was found that if the initial layer contains more than 30 at % of Cr or Cu, the magnetic exchange interaction between particles in the multi-layered magnetic film 14 greatly decreases, and consequently recording noise decreases A probable reason for this phenomenon is that the reheating process causes Cr or Cu atoms in the initial layer to diffuse through grain boundary (with high Cr concentration) in the direction perpendicular to the multi-layered magnetic film 14, and this diffusion enhances the effect of decreasing the magnetic exchange interaction between particles at clear grain boundaries.

A single-layered recording film of CoCr-based alloy has a large value of $K_v$, but because of low Cr content, it also has a high value of Ms (saturation magnetization) and hence a high value of demagnetizing energy. This large demagnetic-energy makes saturation recording difficult, and hence it is not suitable for use as the perpendicular magnetic recording medium.

On the other hand, the multi-layered magnetic film 14 which applies the above high-Kr CoCr (-based) alloy decreases in $M_s$ due to the lamination with the Pd alloy layer and hence the demagnetizing field energy decreases to a proper value. Therefore, the CoCr-based alloy thin film, which has a high value of $K_v$ (crystal magnetic anisotropy energy) and a high value of $M_s$ (saturation magnetization), is provided for use as the CoCr-based alloy layer in the multi-layered magnetic film 14 according to the present invention.

Moreover, the magnetic recording medium 10 of the present invention is preferably modified such that the ferromagnetic metal layer in the multi-layered magnetic film 14 contains Pt in addition to Co and Cr. (The Pt-containing metal layer will be simply referred to as a "CoCrPt alloy layer".)

The incorporation of Pt causes the conventional CoCr-based alloy medium to increase in perpendicular magnetic anisotropy energy has been reported many times. The present inventors found that the same phenomenon is also applicable to the multi-layered magnetic film according to the present invention.

In other words, the CoCrPt alloy layer used as the ferromagnetic metal layer in the multi-layered magnetic film 14 has a larger value of $K_u$ than the CoCr-based alloy layer. This suggests that Pt added to the CoCr-based alloy layer increases the value of $K_v$ (crystal magnetic anisotropy energy). Thus, the incorporation of Pt into the CoCr-based alloy layer is preferred.

It appears that the perpendicular magnetic recording medium exhibits better magnetic characteristics if it has the multi-layered magnetic film 14 composed of CoCrPt alloy layers (with a low Cr concentration) and Pd alloy layers (non-magnetic metal layers) which are laminated alternately, and if heat treatment is performed after the multi-layered magnetic film 14 has been formed.

A detailed description is given below of the kind and amount of elements to be added to the multi-layered magnetic film 14. The Cr concentration in the ferromagnetic metal layer should be in the range of 12 at % to 21 at %. As mentioned above, the lower the Cr concentration in the ferromagnetic metal layer, the greater the value of $K_v$. However, if the Cr concentration is lower than 12 at %, the resulting magnetic recording medium has a high level of recording noise due to magnetic exchange interaction between particles which cannot be reduced even by heat treatment. By contrast, if the Cr concentration is 21 at %, the resulting magnetic recording medium has an adequate level of magnetic exchange interaction between particles even though no heat treatment is performed.

Also, the Pt concentration in the ferromagnetic metal layer should be in the range of 10 at % to 16 at %. The Pt added to the ferromagnetic metal layer increases the value of $K_v$. The effect of Pt becomes maximum when the Pt concentration is higher than 10 at %. However, if the Pt concentration exceeds 16 at %, the magnetic exchange interaction between particles increases, and the recording noise increases accordingly. A probable reason for this is that Pt atoms prevent Cr atoms from displacement toward the grain boundaries.

In addition, it is desirable to add a small amount of B or Ta to the multi-layered film. In general, B or Ta added to the multi-layered film promotes displacement of Cr atoms toward the grain boundaries. However, an excess amount of B or Ta greatly lowers the perpendicular magnetic anisotropy; therefore, their amount is preferably several at %, at most.

The present inventors also studied the magnetic recording medium in which a Pt layer is used as the non-magnetic metal layer. However, it was found that the Pt layer did not contribute to good characteristics. If a Pt alloy layer is used as the non-magnetic metal layer, the interface between the Pt alloy layer and the CoCr-based alloy layer is mixed during sputtering at a low gas pressure. This leads to an insufficient level of $K_s$ (surface magnetic anisotropy energy). In order to use Pt non-magnetic metal layer, the production of the multi-layered magnetic film needs a high sputtering gas pressure in order to achieve a large value of $K_s$. On the other hand, it is necessary to raise the degree of crystallization of CoCr-based alloy in order to increase the value of $K_v$. To this end, it is desirable to perform sputtering at a low gas pressure in order to prevent the sputtering gas from entering the alloy. These film-forming conditions are incompatible with one another for the Pt non-magnetic metal layer.

The results of the present inventors' investigation revealed that a large value of $K_s$ can be obtained at a comparatively low gas pressure if the non-magnetic metal layer is composed mainly of Pd the multi-layered magnetic film 14 composed of ferromagnetic metal layers and non-magnetic metal layers each one layer of which is alternately laminated on top of one layer of the other kind. The magnetic recording film 14, in which Pd is a major component in the non-magnetic metal layer, has high surface magnetic anisotropy, with the CoCr-based alloy layer keeping high crystal magnetic anisotropy.

Incidentally, the multi-layered magnetic film 14 is not specifically restricted in thickness. However, it should have an adequate thickness corresponding to the perpendicular magnetic anisotropy of the multi-layered magnetic film 14, because it is vulnerable to thermal disturbance if it is excessively thin.

The perpendicular magnetic recording medium according to the present invention is described more in detail with reference to the following examples.

EXAMPLE 1

This example demonstrates the perpendicular magnetic recording medium according to the present invention, in which the substrate is a glass disk (76 mm in diameter) with a planarized surface suitable for HDD. This glass disk has a hole (an inside diameter of 15 mm) at its center through which it is placed on to a spindle.

This glass disk was mounted on a sputtering apparatus and then heated at about 100° C. to remove any adsorbed water. On the glass disk was formed an underlying layer (40 nm thick) from $NiTa_{37}Zr_{10}$ alloy. On the underlying layer was sequentially formed a Pd film (5 nm thick), a multi-layered magnetic film, a Pd film (1 nm thick), and a carbon protective film. The multi-layered magnetic film is composed of noble metal layers and ferromagnetic metal layers each one layer of which are laminated alternately on top of one layer of the other kind.

The multi-layered magnetic film is formed by using a rotary cathode device as shown in FIG. 2. The rotary cathode has three target cathodes 22 which rotate along the same circle to form a film on the substrate 21 placed right above the center of the circle.

If two target cathodes (A and B) are mounted on the rotary cathode device and they are subjected to discharging, it is possible to form a multi-layered film (composed of layers A and layers B which are laminated alternately) in a short time (hereinafter "simultaneous discharging method").

Figure 3A:
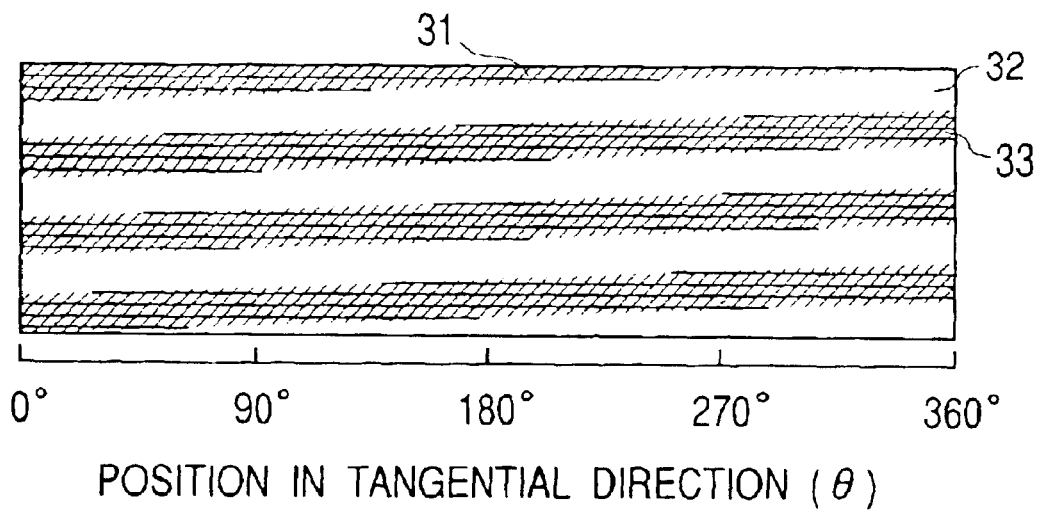
FIG. 3 is a diagram of the multi-layered film formed by a simultaneous discharging or an alternate discharging with the rotary cathode.
Figure 3B:
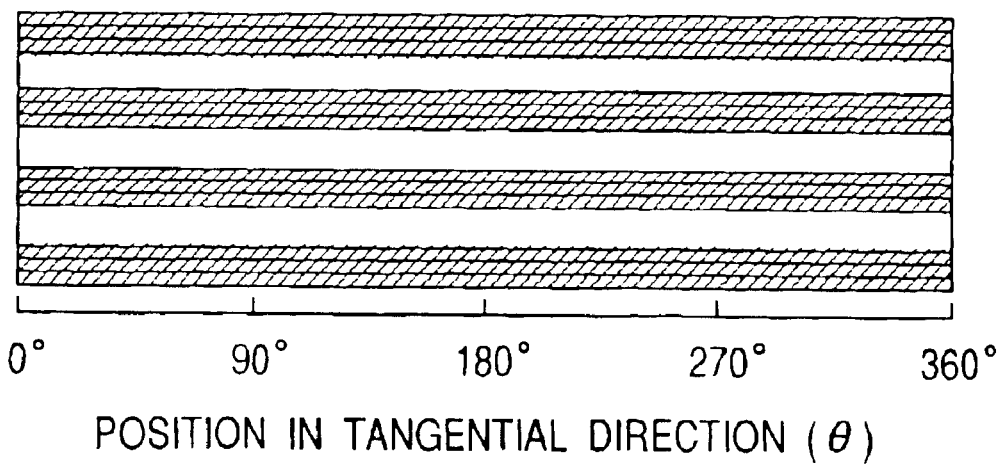

This rotary cathode device gives rise to a multi-layered magnetic film 31 shown in FIG. 3(*a*). This multi-layered magnetic film 31 is not composed of complete layers. That is, the noble metal layers 32 and the ferromagnetic metal layers 33 are formed such that the position of their interface periodically moves. However, the multi-layered magnetic film 31 may be regarded as lamellar because the circumference of the glass disk is sufficiently large (50 mm or above) relative to the thickness of each layer (about 1 nm).

It is also possible to form the multi-layered structure as shown in FIG. 3(*b*) if the targets A and B on the rotary cathode device are actuated for discharging alternately (hereinafter "alternate discharging method").

In general, the simultaneous discharging method is advantageous over the alternate discharging method in producing the multi-layered magnetic film of periodic structure in a short time. Therefore, the simultaneous discharging method was employed in this and following examples.

In this example, a recording medium of multi-layered structure having a multi-layered magnetic film composed of ferromagnetic metal layers of $CoCr_{21}$ (referred to as $CoCr_{21}$ alloy layers) and noble metal layers of Pd which are laminated alternately on top of the other was prepared. ("Pd/$CoCr_{21}$ medium" hereinafter.)

In this example, a recording medium of multi-layered structure having a multi-layered magnetic film composed of ferromagnetic metal layers of $CoCr_{21}$ (referred to as $CoCr_{21}$ alloy layers) and noble metal layers of Pt which are laminated alternately on top of the other was also prepared for comparison. ("Pd/$CoCr_{21}$ medium" hereinafter.)

The multi-layered magnetic film was formed such that each $CoCr_{21}$ alloy layer is 2.0 nm thick and each noble metal layer is 0.2–1.4 nm thick, with the total thickness being 20 nm. The layer thickness d1 and d2, the thickness ratio d1/d2, and the laminating period were controlled by regulating the sputtering power onto the noble metal target and Co alloy target, as well as the speed of the rotary cathode device. The substrate was preheated so that its temperature was 250° C. when the multi-layered magnetic film was formed.

In a comparative example, a perpendicular magnetic recording medium which consists of a substrate, an underlying layer (40 nm thick) of $NiTa_{37}Zr_{10}$ alloy, a Pd film (5 nm thick), a single-layered magnetic film (20 nm thick) of $CoCr_{21}$, a Pd film (1 nm thick), and a carbon protective film was prepared ("$CoCr_{21}$ medium" hereinafter). The single-layered magnetic film is a $CoCr_{21}$ film having the axis of magnetization in the perpendicular direction. The substrate was heated at 250° C. immediately before the magnetic film was formed as in the case of forming the Pd(Pt)/$CoCr_{21}$ medium.

Figure 4:
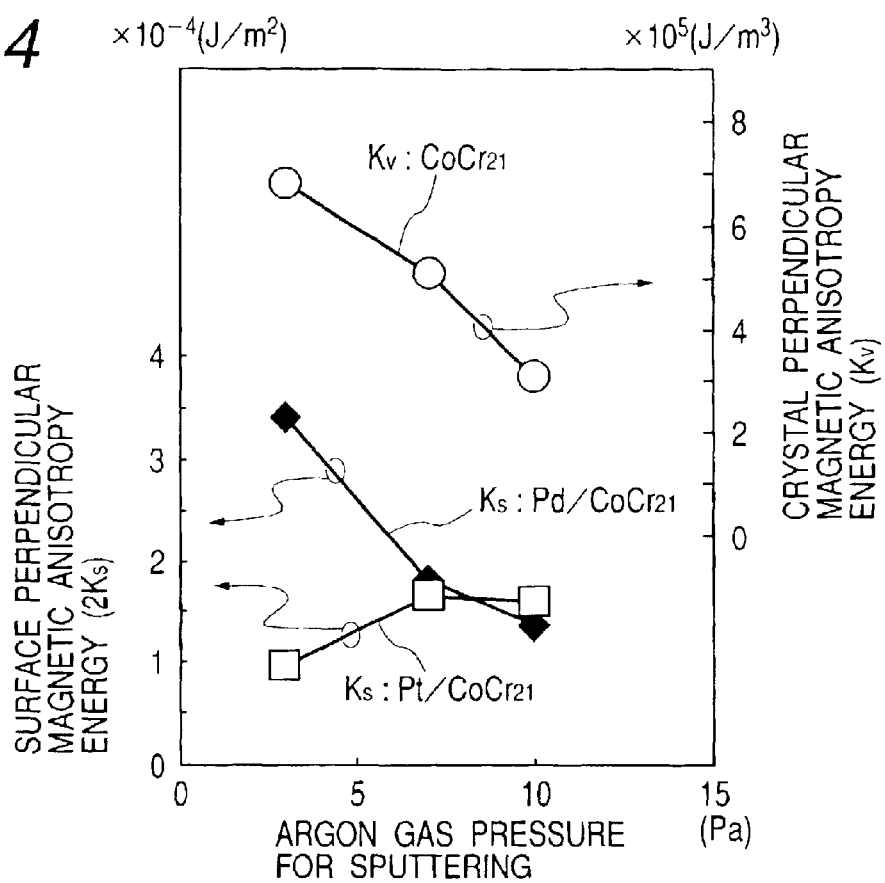
FIG. 4 shows the relation between the Ar gas pressure and the perpendicular magnetic anisotropy energy which is observed during the production of the multi-layered film.

The sputtering gas pressure affects the surface magnetic anisotropy energy $K_s$ of the multi-layered magnetic film and the crystal magnetic anisotropy energy $K_v$ of the $CoCr_{21}$ film (which is a single-layered magnetic film) as shown in FIG. 4. The noble metal layer in the multi-layered magnetic film is 0.8 nm thick.

The perpendicular magnetic anisotropy energy $K_u$ in the multi-layered magnetic film medium depends on $K_s$ and $K_v$, as approximately represented by equation (1) below. (H. J. G. Draaisam et al., J. Magn. Magn. Mater. 66 (1987) 351–355)

$$K_u \cdot \lambda = 2 \cdot K_s + t \cdot K_v \quad (1)$$

In equation (1), $K_u$ represents the perpendicular magnetic anisotropy energy of the multi-layered magnetic film as a whole, $K_s$ represents the surface magnetic anisotropy energy (per unit area) in the interface between the $CoCr_{21}$ alloy layer and the noble metal layer, and $K_v$ represents the crystal magnetic anisotropy energy of the $CoCr_{21}$ alloy layer. T denotes the thickness of each $CoCr_{21}$ alloy layer, λ denotes the period of lamination, and $2 \cdot K_s$ denotes the surface magnetic anisotropy energy (for two interfaces) due to one period in the multi-layered film.

The value of $K_v$ (crystal magnetic anisotropy energy) includes the shape anisotropy of the film ($-2\pi M_s^2$) which occurs when the recording film is magnetized in one direction. As equation (1) suggests, the ratio of $K_v$ to $K_u$ increases in proportion to the thickness (t) of the $CoCr_{21}$ alloy layer.

In the present invention, the surface magnetic anisotropy energy was calculated according to equation (1) under on the assumption that $K_v$ of the $CoCr_{21}$ alloy layer in the multi-layered magnetic film is equal to $K_v$ of the $CoCr_{21}$ film (20 nm thick) as a single-layered magnetic film.

FIG. 4 suggests that the value of $K_s$ increases as the sputtering gas pressure increases if Pt is used in the noble metal layer. By contrast, the value of $K_s$ increases as the sputtering gas pressure decreases if Pd is used in the noble metal layer. On the other hand, the $K_v$ value of $CoCr_{21}$ alloy film rapidly decreases as the sputtering gas pressure increases.

In order to achieve the object of the present invention, it is necessary to form the multi-layered magnetic film which has high surface anisotropy energy $K_s$ such that the $CoCr_{21}$ alloy layer keeps high crystal magnetic anisotropy. FIG. 4 suggests that for the $CoCr_{21}$ alloy layer to have high perpendicular magnetic anisotropy, it is necessary to perform sputtering at a low sputtering gas pressure. If the noble metal layer and the $CoCr_{21}$ alloy layer are formed in the same sputtering chamber, it is necessary to obtain high surface magnetic anisotropy energy under the condition of low gas pressure. This apparently suggests that it is desirable to use Pd for the noble metal layer constituting the multi-layered magnetic film.

The results shown in FIG. 4 are discussed in the following. In general, sputtering method for forming a film tends to cause sputtering gas (such as Ar) to enter the film during the film-forming process. Therefore, the sputtering gas pressure should be as low as possible to give a high-purity alloy so long as discharging can be performed under acceptable conditions. The value of $K_v$ (crystal magnetic anisotropy energy) depends largely on the degree of crystallization of the CoCr-based alloy. It is a matter of course that the value of $K_v$ (crystal magnetic anisotropy energy) increases as the sputtering gas pressure decreases.

As mentioned, it is desirable to increase the sputtering gas pressure in the production of superlattice. In fact, U.S. Pat. No. 5,106,703 (mentioned above) mentions that the coercive force increases if the sputtering gas pressure is increased, and Ar, as the sputtering gas, is replaced by Xe or Kr. Usually, the coercive force is proportional with the perpendicular magnetic anisotropy energy.

However, FIG. 4 indicates that the Pt/$CoCr_{21}$ medium and the Pd/$CoCr_{21}$ medium behave greatly differently toward the sputtering gas pressure. It is noted that the noble metal layer with Pd has a high value of $K_s$ when the pressure of Ar sputtering gas is low.

Such a difference between Pd and Pt in the noble metal layer arises from the difference in their atomic weight (Pd=195.1, Pt=106.4). The multi-layered structure requires that the layer interface (as the source of surface magnetic anisotropy) be formed neatly. To this end, it is necessary to keep sufficiently low the kinetic energy of sputtering particles sticking to the film such that sputtering particles impinge upon the film without destroying the layer interface.

Sputtering particles are scattered by collision with sputtering gas at a high pressure in the chamber, so that they lose their kinetic energy. However, Pt particles do not readily lose their kinetic energy unless the sputtering gas pressure is considerably high, because Pt has a much larger atomic weight than Ar. (Ar=40) By contrast, Pd particles readily lose their kinetic energy at a comparatively low sputtering gas pressure although the difference between Pd and Ar in atomic weight is not so large.

The relation between sputtering gas pressure and sputtering rate was investigated by using the same chamber as mentioned. It was found that when the sputtering gas pressure was raised from 3 Pa to 10 Pa, the sputtering rate of Pt remained almost unchanged but the sputtering rate of Pd decreased by more than half. This result suggests that there are more Pd particles which do not reach the substrate due to scattering by the sputtering gas. This coincides with the above-mentioned prediction.

Sputtering at a low gas pressure is close to the condition under which the conventional single-layered CoCr-based alloy crystalline recording film is formed. In this case, a good layer interface is readily obtained because there is only a small amount of impurities in the multi-layered magnetic film. In the case where Pd is used to form the noble metal layer, the value of $K_s$ is high when the gas pressure is low because the effect of making a good layer interface excels the effect of destroying the interface by the sputtering particles.

Incidentally, since Co has a smaller atomic weight (58.9) than noble metal, Co sputtering particles are less likely to damage the interface than the noble metal sputtering particles. Sputtering with Xe or Kr (with an atomic weight of 131.2 and 83.8, respectively) would be favorable to Pt; however, Ar is advantageous costwise.

Figure 5:
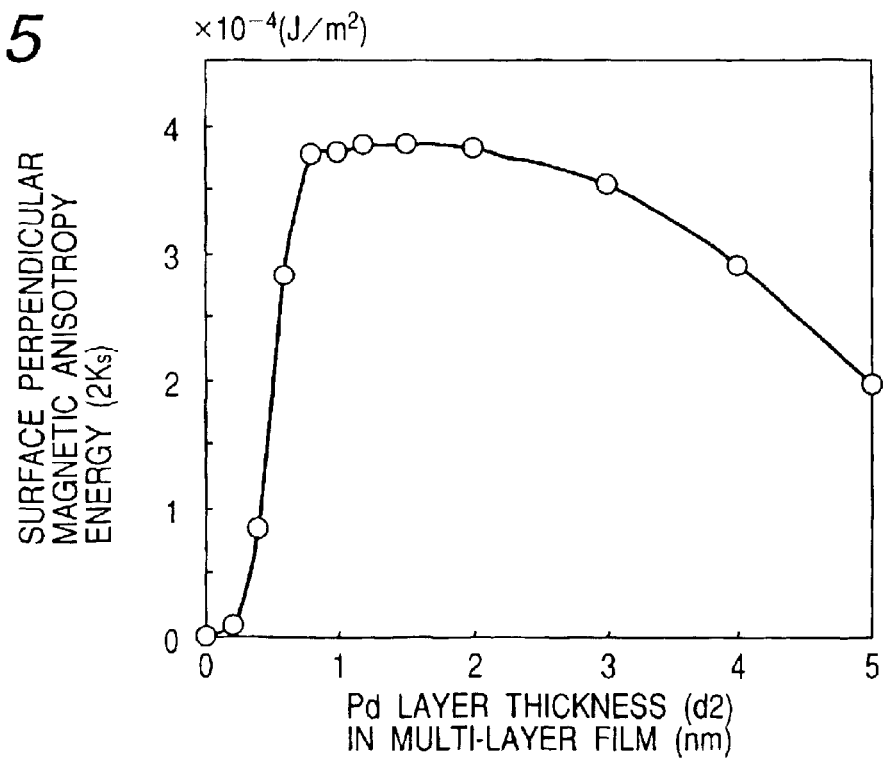
FIG. 5 shows how the surface magnetic anisotropy depending on the thickness of Pd film in the magnetic recording medium of the Example 1.

An experiment was carried out to see how the surface magnetic anisotropy energy of the multi-layered magnetic film depends on the thickness of the noble metal layer in the case of $CoCr_{21}$ alloy medium in which the thickness of the $CoCr_{21}$ alloy layer is fixed at 2.0 nm. The result of the experiment is shown in FIG. 5. It is noted that the surface perpendicular magnetic anisotropy energy ($K_s$) increases with the increasing thickness of the noble metal layer of Pd. It rapidly increases until the thickness reaches 0.6 nm, and it becomes saturated when the thickness further increases from 0.8 nm to 1.0 nm. This suggests that an excessively thin noble metal layer (Pd) does not contribute to the surface perpendicular magnetic anisotropy energy arising from the multi-layered film structure.

Why the surface perpendicular magnetic anisotropy energy is small when the thickness of the Pd layer is small may be explained as follows. (1) If the Pd layer is excessively thin, no good layer structure is formed. (2) There are no sufficient electrons to generate the magnetic anisotropy energy if the Pd layer is excessively thin. (Magnetic anisotropy is caused by electrons in the Pd layer.)

It was found that each of the $CoCr_{21}$ alloy layers have individually different coercive force if the Pd noble metal layer is made thicker than 2.0 nm. This suggests that magnetic exchange interaction between $CoCr_{21}$ alloy layers becomes so small that domains in each layer can reverse independently. Under this situation, the multi-layered magnetic films as a whole do not function as a single magnetic film. That is, it cannot be used as the recording magnetic film. The Pd noble metal layer in the multi-layered magnetic film should be thinner than 2.0 nm.

A probable reason why the surface magnetic anisotropy energy becomes saturated when the thickness of the Pd noble metal layer is approximately 1.0 nm is that magnetization induced by the Pd noble metal layer is limited to about 0.5 nm (about two-atom layer) from the interface between the $CoCr_{21}$ alloy layer and the Pd noble metal layer caused by Co.

The present inventors measured the magnitude of magnetization induced in the Pd noble metal layer by the adjacent $CoCr_{21}$ alloy layer. It was found that average magnetization remains nearly constant at about 100 kA/m when the Pd noble metal alloy is thinner than 1.0 nm but it decreases as the thickness of the Pd noble metal layer exceeds 1.0 nm. It is considered that magnetization induced in the Pd noble metal layer is responsible for at least part of surface magnetic anisotropy energy.

Then, the present inventors prepared several samples multi-layered magnetic film medium ($Pt/CoCr_{21}$ medium) which vary in the thicknesses of the Pd noble metal layer and the $CoCr_{21}$ alloy layer. The multi-layered magnetic film was tested for perpendicular magnetic anisotropy energy and saturation magnetization. The results are shown in Tables 1 and 2.

As a reference, the present inventors also prepared a $CoCr_{21}$ medium with a 20-nm thick single-layered magnetic film. It was found that the single-layered magnetic film has perpendicular anisotropy energy of about $0.8 \times 10_5$ $J/m^3$ and saturation magnetization of 250 kA/m. This single-layered magnetic film gave an M-H curve with a squareness ratio of about 0.55.

TABLE 1

Structure and perpendicular magnetic anisotropy energy of multi-layered magnetic film in $Pd/CoCr_{21}$ medium (unit: × $10^5$ $J/m^3$)

| | | Thickness of Pd film (nm) | | | | | | |
|---|---|---|---|---|---|---|---|---|
| | | 0.2 | 0.4 | 0.6 | 0.8 | 1.0 | 1.2 | 1.5 |
| Thickness of $CoCr_{21}$ alloy film (nm) | 0.3 | 0.70 | 1.54 | 3.42 | 3.65 | 3.15 | 2.68 | 2.35 |
| | 0.5 | 0.75 | 1.32 | 2.95 | 3.30 | 2.82 | 2.45 | 2.15 |
| | 0.8 | 0.75 | 1.23 | 2.52 | 2.75 | 2.38 | 2.36 | 1.95 |
| | 1.0 | 0.80 | 1.15 | 2.15 | 2.42 | 2.21 | 2.20 | 1.83 |
| | 1.5 | 0.83 | 1.02 | 1.90 | 2.12 | 1.95 | 1.93 | 1.67 |
| | 2.0 | — | 1.10 | 1.73 | 1.95 | 1.76 | 1.68 | 1.55 |
| | 2.5 | — | 0.93 | 1.55 | 1.82 | 1.65 | 1.58 | 1.46 |
| | 3.0 | — | — | 1.51 | 1.66 | 1.52 | 1.46 | 1.42 |
| | 4.0 | — | — | 1.32 | 1.45 | 1.40 | 1.32 | 1.30 |
| | 5.0 | — | — | — | — | 1.32 | 1.33 | 1.20 |
| | 6.0 | — | — | — | — | 1.33 | 1.25 | 1.06 |

TABLE 2

Structure and saturation magnetization ($M_s$) of multi-layered magnetic film in $Pd/CoCr_{21}$ medium (unit: kA/m)

| | | Thickness of Pd film (nm) | | | | | | |
|---|---|---|---|---|---|---|---|---|
| | | 0.2 | 0.4 | 0.6 | 0.8 | 1.0 | 1.2 | 1.5 |
| Thickness of $CoCr_{21}$ alloy film (nm) | 0.3 | 190 | 168 | 150 | 140 | 135 | 135 | 130 |
| | 0.5 | 209 | 185 | 167 | 152 | 150 | 142 | 135 |
| | 0.8 | 220 | 202 | 186 | 178 | 168 | 163 | 160 |
| | 1.0 | 222 | 210 | 192 | 182 | 175 | 163 | 158 |
| | 1.5 | 230 | 218 | 205 | 193 | 190 | 179 | 170 |
| | 2.0 | — | 226 | 215 | 202 | 200 | 186 | 188 |
| | 2.5 | — | 230 | 221 | 205 | 205 | 205 | 194 |
| | 3.0 | — | — | 226 | 212 | 207 | 205 | 200 |
| | 4.0 | — | — | 230 | 225 | 226 | 209 | 210 |
| | 5.0 | — | — | — | — | 224 | 233 | 215 |
| | 6.0 | — | — | — | — | 226 | 226 | 220 |

It is noted that the multi-layered magnetic film has much larger perpendicular anisotropy energy than the single-layered magnetic film of $CoCr_{21}$ medium. It is noted from Table 2 that the multi-layered magnetic film decreases in saturation magnetization due to the Pd layer.

For the perpendicular magnetic recording medium to have stable magnetization, it is necessary that its M-H curve has a squareness ratio close to 1. This can be checked in terms of a parameter of $K_u/2\pi M_s^2$ according to Shimazu et al. (Nippon Ouyou Jiki Gakkaishi, vol. 25, No. 4-2, pp. 539–542). The reference pointed out that this parameter should essentially be greater than 3 for a practical magnetic recording medium (with magnetic particles with an approximate diameter of 10 nm) in consideration of effect on it by thermal disturbance and demagnetizing field. Since $K_u/2\pi M_s^2 = H_k/4\pi M_s$, this parameter represents the magnitude ratio of the anisotropic magnetic field to the demagnetizing field ($H_k$ is a value of the physical property which indicates how hard it is for magnetic particles to undergo magnetization reversal). In other words, it is an index indicating how stable the magnetization is in the medium against the demagnetization field induced when the recording bits are uniformly magnetized.

The $CoCr_{21}$ alloy medium referenced in this example has a value of $K_u/2\pi M_s^2 = 1.73$. This value suggests that the squareness ratio apparently deviating from 1. This parameter was calculated also for the multi-layered magnetic film in this example. The results are shown in Table 3.

TABLE 3

Structure and $K_u/2\pi M_s^2$ value of multi-layered magnetic film in $Pd/CoCr_{21}$ medium (unit: none)

| | | Thickness of Pd film (nm) | | | | | | |
|---|---|---|---|---|---|---|---|---|
| | | 0.2 | 0.4 | 0.6 | 0.8 | 1.0 | 1.2 | 1.5 |
| Thickness of $CoCr_{21}$ alloy film (nm) | 0.3 | 3.086 | 8.684 | 24.19 | 29.64 | 27.51 | 23.40 | 22.13 |
| | 0.5 | 2.733 | 6.138 | 16.83 | 22.73 | 19.95 | 19.34 | 18.78 |
| | 0.8 | 2.466 | 4.798 | 11.59 | 13.81 | 13.42 | 11.14 | 12.12 |
| | 1.0 | 2.583 | 4.150 | 9.282 | 11.63 | 11.49 | 13.18 | 11.67 |
| | 1.5 | 2.497 | 3.416 | 7.196 | 9.058 | 8.597 | 9.587 | 9.197 |
| | 2.0 | — | 3.428 | 5.956 | 7.606 | 7.003 | 7.729 | 6.980 |
| | 2.5 | — | 2.798 | 5.051 | 6.893 | 6.249 | 5.984 | 6.174 |
| | 3.0 | — | — | 4.705 | 5.878 | 5.646 | 5.529 | 5.650 |
| | 4.0 | — | — | 3.971 | 4.559 | 4.362 | 4.810 | 4.692 |
| | 5.0 | — | — | — | — | 4.187 | 4.257 | 4.132 |
| | 6.0 | — | — | — | — | 4.144 | 3.895 | 3.486 |

It is noted from Table 3 that the multi-layered magnetic film has a considerably large value of $K_u/2\pi M_s^2$ because the surface magnetic anisotropy enhances the perpendicular magnetic anisotropy energy and the Pd layer suppresses the average magnetization of the multi-layered film as a whole.

For the multi-layered magnetic film to be a suitable perpendicular magnetic recording medium, it should have perpendicular magnetic anisotropy energy, saturation magnetization, and $K_u/2\pi M_s^2$ value as desired, as well as good recording characteristics.

Thus, the present inventors tested the perpendicular magnetic recording medium in this example so as to realize low recording noise for the structure of the multi-layered magnetic film.

The test procedure consists of recording a continuous pattern with a recording density of 300 kFCI on each sample of the perpendicular magnetic recording medium and reproducing the continuous pattern to measure the integral value of recording noise.

The perpendicular magnetic recording medium for recording and reproducing tests has an FeTaC soft magnetic layer (400 nm thick) on that side of the NiTaZr underlying layer which faces the substrate. Recording was accomplished by using a single pole type head, and reproducing was accomplished by using a GMR sensor mounted on the same head.

Figure 6:
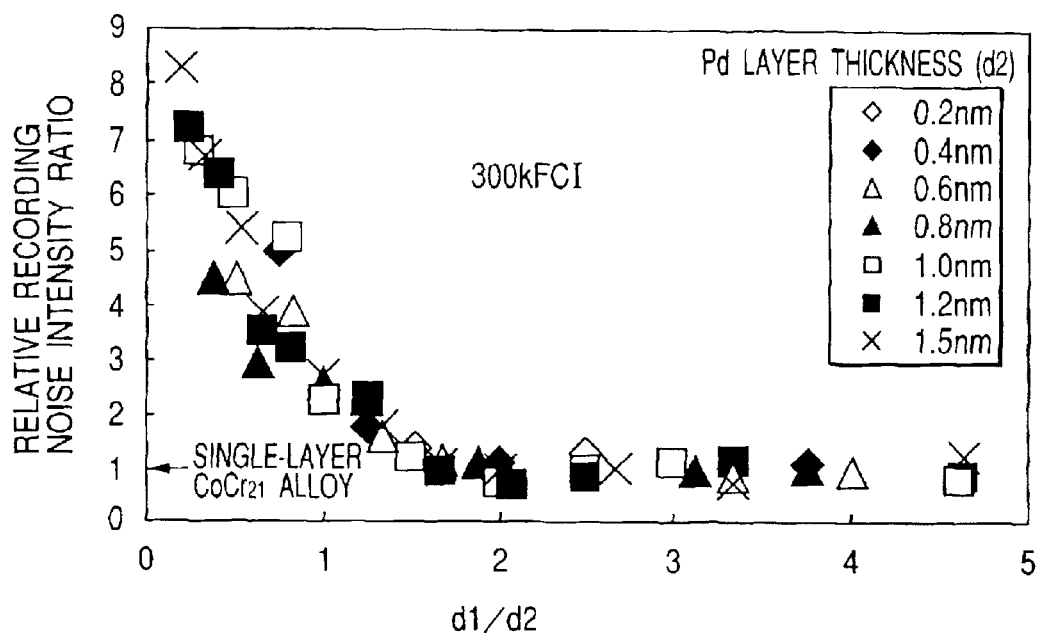
FIG. 6 shows how recording noise depending on the ratio of d1/d2 (where d1 denotes the thickness of Pd layer and d2 denotes the thickness of Co alloy layer) in the magnetic recording medium of the Example 1.

It was found that recording noise depends on the ratio of d1/d2 (where d1 denotes the thickness of the $CoCr_{21}$ alloy layer and d2 denotes the thickness of the Pd noble metal layer) as shown in FIG. 6. In FIG. 6, recording noise is given in terms of relative noise strength compared with the noise of the $CoCr_{21}$ medium with the single-layered magnetic film (for reference). The noise strength of each medium is normalize with respect to the low-frequency signal strength.

It is noted that the relative noise strength decreases as the relative thickness of the $CoCr_{21}$ alloy layer increases (or it is about 1 when d1/d2 is about 1.5). A probable reason why the recording noise is large when the d1/d2 is small is that there is large magnetic exchange interaction between particles and there is large domain wall displacement at the time of recording. This result suggests that the multi-layered magnetic recording medium has a low level of recording noise as in the $CoCr_{21}$ medium with the single-layered magnetic film if it is constructed such that the $CoCr_{21}$ alloy layer is more than 1.5 times thick than the Pd noble metal layer. It was necessary to keep the substrate at about 250° C. when layers are formed thereon.

Figure 7:
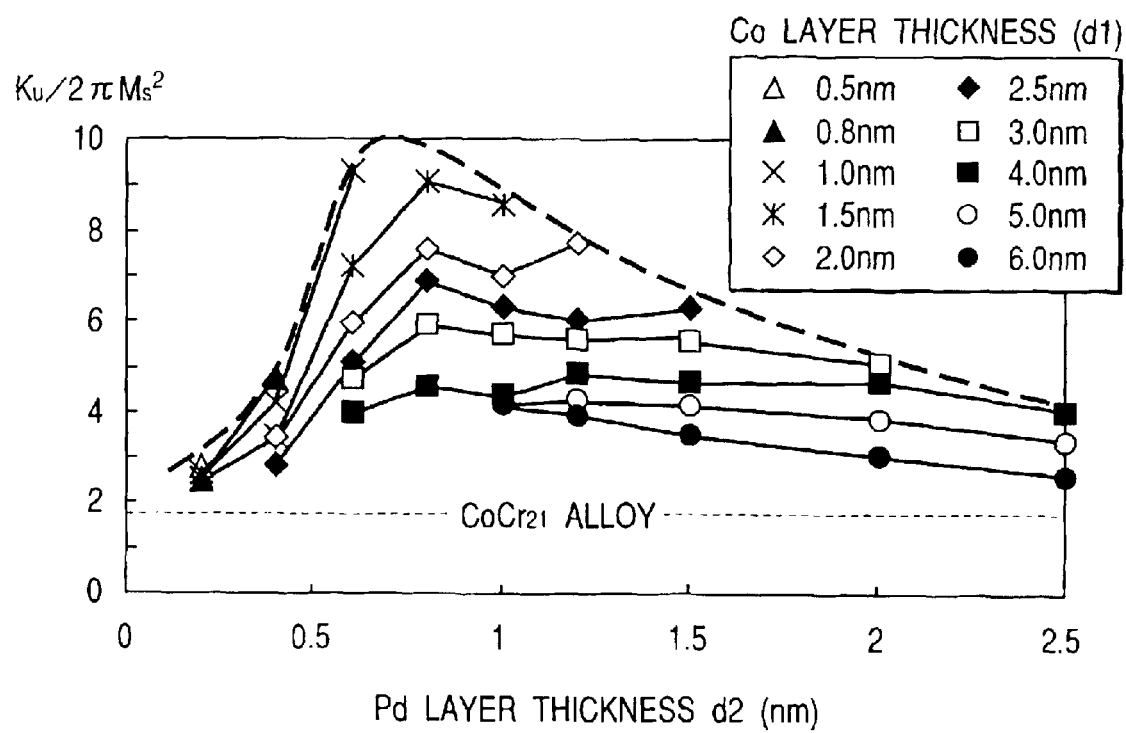
FIG. 7 shows how the thermal stability parameter $k_u/2\pi M_s^2$ depending on d1 and d2 in the magnetic recording medium of the Example 1.

The values of $K_u/2\pi M_s^2$ (smaller than 10) in Table 3 are plotted against the thickness of the Pd noble metal layer, with the thickness of the $CoCr_{21}$ alloy layer varied, as shown in FIG. 7. All layer thickness conditions plotted in FIG. 7 satisfy a condition that its d1/d2 value is larger than 1.5 such that the magnetic exchange interaction between particles is sufficiently reduced. It is noted from FIG. 7 that all of the multi-layered magnetic recording medium have larger $K_u/2\pi M_s^2$ values than the $CoCr_{21}$ medium for reference. This suggests that the multi-layered magnetic film medium is more thermally stable than the single-layered magnetic film medium.

In FIG. 7, all the plotted points are within the thick broken line. If the Pd noble metal layer is excessively thin, the surface magnetic anisotropy is insufficient. If the Pd noble metal layer is excessively thick, the density in the interface decreases because it is necessary that the $CoCr_{21}$ alloy layer should also be thick. Consequently, the thickness of the Pd noble metal layer which gives the maximum value of $K_u/2\pi M_s^2$ is 0.8 to 1.0 nm, which is equivalent to the thickness at which the surface magnetic anisotropy energy becomes saturated.

Figure 8:
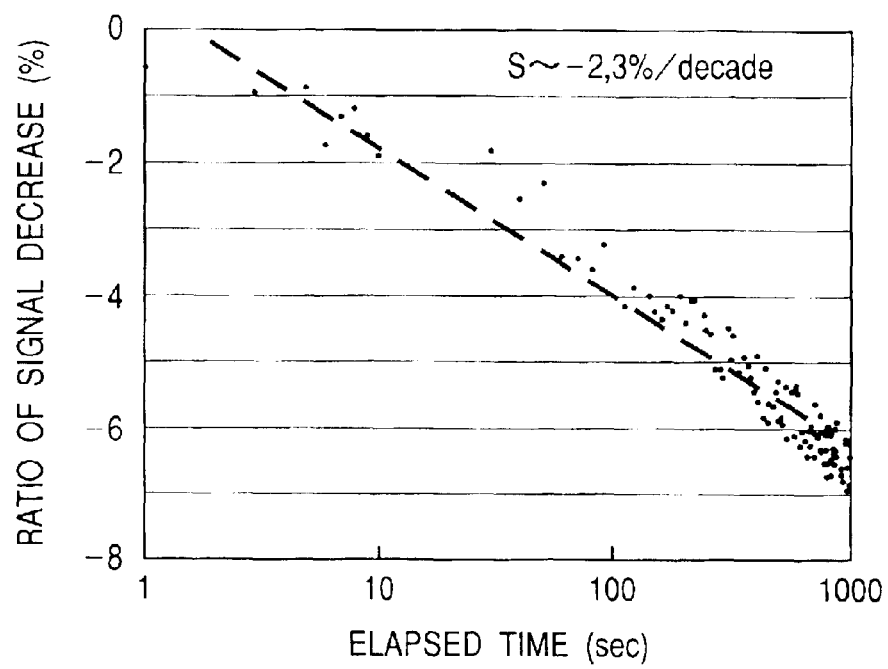
FIG. 8 is a diagram in which the reduction of reproducing signal is plotted against the elapsed time.

The present inventors examined the relation between the $K_u/2M_s^2$ value and the thermal demagnetizing factor S of the multi-layered magnetic film medium in this example by recording a continuous pattern (20 kFCI) on each sample of the medium and then measuring the amount of loss in the reproduced signal. The thermal demagnetizing factor S is the coefficient of magnetic viscosity which relates the rate of signal loss to $\log_{10}$ (time). It was determined by plotting the amount of signal loss (measured for a period of 1000 seconds) on a graph in which the abscissa represents $\log_{10}$ (time) and the ordinate represents the rate of signal loss. An example of measurements is shown in FIG. 8.

Figure 9:
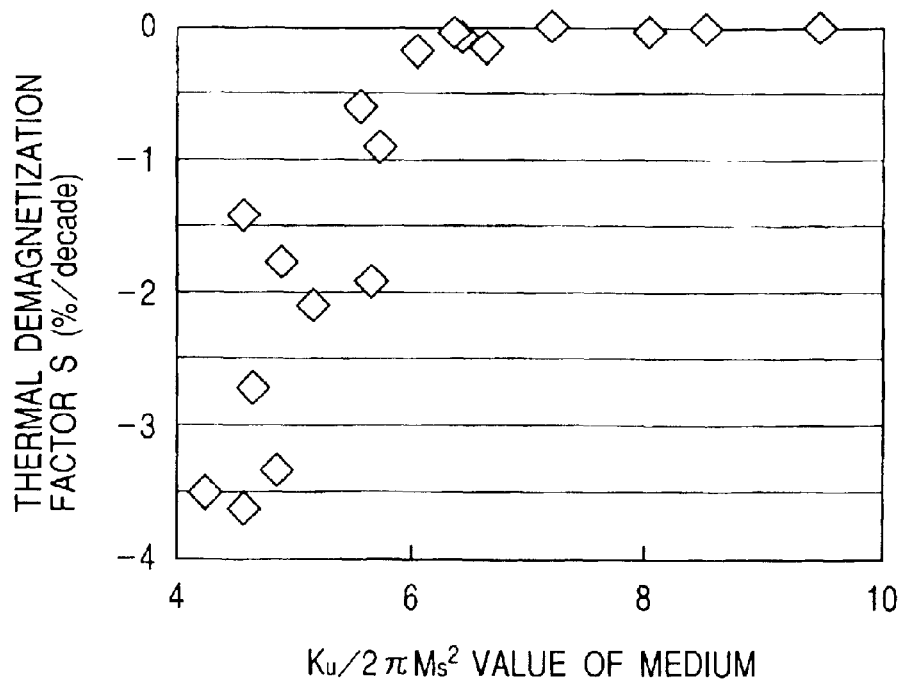
FIG. 9 shows the relation between the thermal stability parameter $K_u/2\pi M_{s2}$ and the thermal demagnetization factor S in the magnetic recording Medium of the Example 1.

In FIG. 9, the thermal demagnetizing factor S is plotted against the $K''/2\pi M_s^2$ value of each medium. FIG. 9 indicates that the thermal demagnetizing factor S approaches zero when $K_u/2\pi M_s^2$ increases. In other words, thermal demagnetization is practically negligible for the $K_u/2\pi M_s^2$ value exceeding 6. The result of this investigation suggests that the $K_u/2\pi M_s^2$ value should be greater than 6 so that the perpendicular magnetic recording medium permits recorded signals to remain thermally stable.

It is noted from FIG. 7 that this condition is satisfied when the thickness (d2) of the Pd noble metal layer is larger than 0.6 nm. If the Pd alloy layer is excessively thick (or thicker than 2.0 nm), magnetic exchange interaction between CoCr-based alloy layers is insufficient and hence CoCr-based alloy layers would have different coercive force independently. Therefore, the thickness (d2) of the Pd noble metal layer should be from 0.6 nm to 2.0 nm, and preferably, from 0.8 nm to 1.2 nm.

Figure 10:
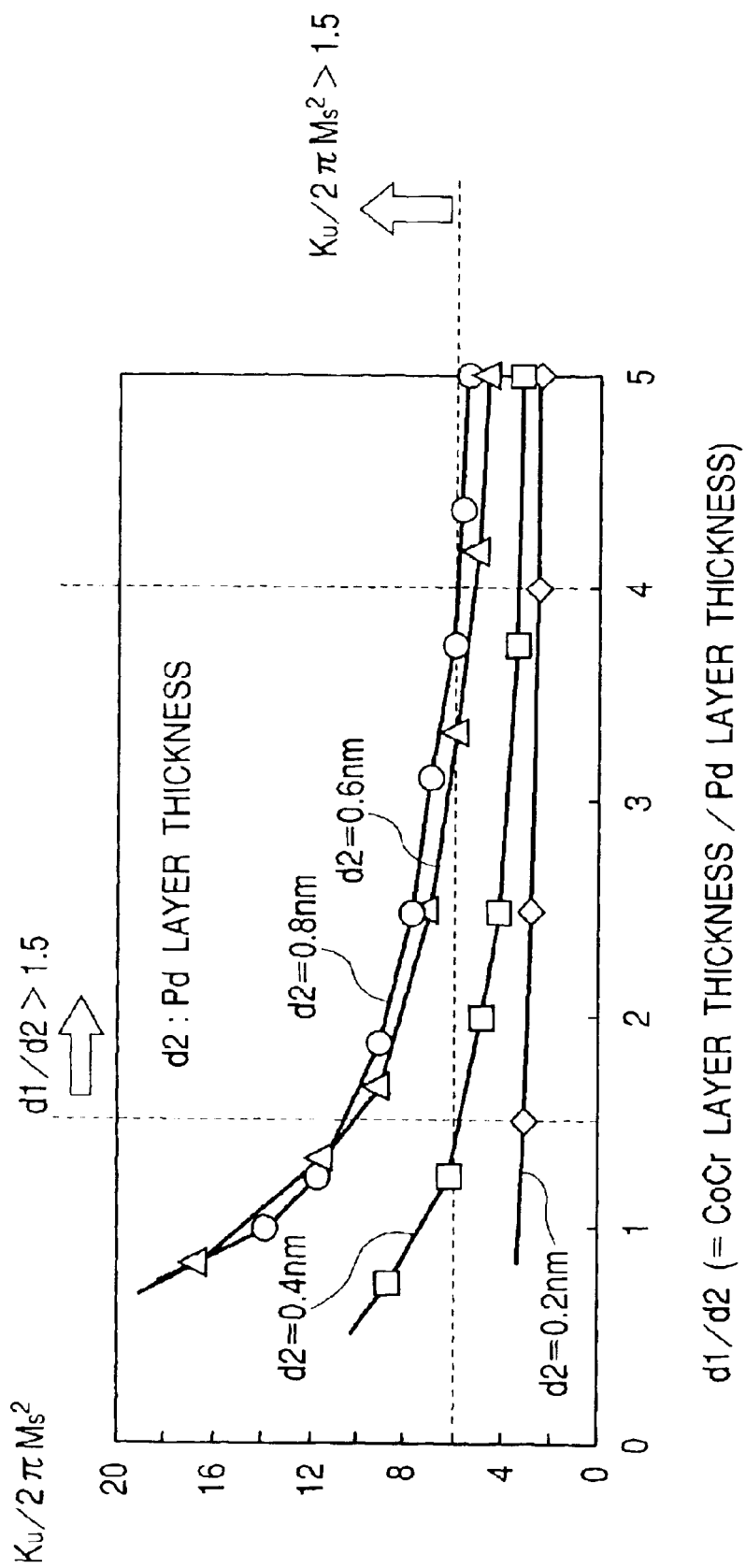
FIG. 10 shows the relation between the thermal stability parameter $K_u/2\pi M_{s2}$ and the ratio of d1/d2 in the magnetic recording medium of the Example 1.

The data in FIG. 7 is rearranged in FIG. 10. In FIG. 10, the $K_u/2\pi M_s^2$ value is plotted against the ratio of d1/d2 (where d1 is the thickness of the CoCr-based alloy layer and D2 is the thickness of the Pd noble metal layer). It is noted that the $K_u/2\pi M_s^2$ value is not large when the thickness of the Pd layer is 0.2 nm or 0.4 nm. The above-mentioned condition is not met when the ratio of d1/d2 is smaller than 1.5 (requirement for good signal quality). On the other hand, for the Pd layer with a thickness of 0.6 nm, the $K_u/2\pi M_s^2$ value suddenly increases and the condition that d1/d2 is larger than 1.5 and $K_u/2\pi M_s^2$ is larger than 6 is met. However, with an excessively large d1/d2, the condition that $K_u/2\pi M_s^2$ is larger than 6 is not met because the laminate period decreases (and hence the number of interfaces between the Co layers and Pd layers decreases), and the surface magnetic anisotropy energy decreases. FIG. 10 shows limited data for the Pd layer with a thickness up to 0.8 nm. Beyond this thickness, the value of $K_u/2\pi M_s^2$ tends to decrease. It is concluded from FIG. 10 that the allowable maximum value of d1/d2 is 4.

EXAMPLE 2

This example demonstrates a magnetic recording medium in which the ferromagnetic metal layer is formed from a material having a large value of Kv in place of the CoCr-based alloy used in Example 1. In Example 1, the CoCr layer as the ferromagnetic metal layer is inherently limited in crystal perpendicular magnetic anisotropy energy $K_v$, and hence the range of d1/d2 for keeping the $K_u/2\pi M_s^2$ value exceeding 6 (with the maximum being about 10) is rather narrow. The advantage of the recording medium in this example is that the problem with thermal demagnetization can be avoided even in the case where the diameter of magnetic particles is reduced further in order to decrease recording noise.

The multi-layered magnetic recording medium prepared in this example consists of a substrate, an underlying layer of $NiTa_{37}Zr_{10}$ alloy (40 nm thick), a Pd film (5 nm thick), a multi-layered magnetic film of $Pd/CoCr_{21}Pt_{14}$, a Pd film (1 nm thick), and a carbon protective film, which are sequentially placed on top of the other. The multi-layered magnetic film of $Pd/CoCr_{21}Pt_{14}$ is referred to as "$Pd/CoCr_{21}Pt_{14}$ film" hereinafter. The multi-layered magnetic recording medium is referred to as "$Pd/CoCr_{21}Pt_{14}$ medium" hereinafter. Incidentally, the total thickness of the multi-layered magnetic film is about 20 nm, and the substrate was heated to 250° C. immediately before film lamination.

A comparative sample of perpendicular magnetic recording medium was also prepared, which consists of a substrate, an underlying layer of $NiTa_{37}Zr_{10}$ alloy (40 nm thick), a Pd film (5 nm thick), a single-layered magnetic film of $CoCr_{21}Pt_{14}$, a Pd film (1 nm thick), and a carbon protective film, which are sequentially placed on top of the other. The single-layered magnetic film of $CoCr_{21}Pt_{14}$ is referred to as "$CoCr_{21}Pt_{14}$ film" hereinafter. The single-layered magnetic recording medium is referred to as "$CoCr_{21}Pt_{14}$ medium" hereinafter. As in the $Pd/CoCr_{21}Pt_{14}$ medium, the substrate was heated to 250° C. immediately before film deposition.

The $CoCr_{21}Pt_{14}$ film was found to have perpendicular anisotropy energy of about $1.6 \times 10^5$ J/m³ and saturation magnetization of 250 kA/m. The $CoCr_{21}Pt_{14}$ film is quite similar in saturation magnetization to the $CoCr_{21}$ alloy layer (in Example 1) which does not contain Pt. However, the $CoCr_{21}Pt_{14}$ single-layered magnetic film increases in crystal magnetic anisotropy.

As shown above, the incorporation of Pt into the ferromagnetic metal layer of CoCr-based alloy is an effective way for increasing the magnetic anisotropy of the magnetic film. The comparison of the $Pd/CoCr_{21}Pt_{14}$ medium with the $Pd/CoCr_{21}$ medium revealed that the former has larger perpendicular magnetic anisotropy energy than the latter but there is no significant difference between them in the average saturation magnetization of the entire multi-layered film. The increment of perpendicular magnetic anisotropy is due mostly to crystal magnetic anisotropy energy but very little to surface magnetic anisotropy energy. The $CoCr_{21}Pt_{14}$ alloy is suitable for use as the ferromagnetic metal layer of the multi-layered magnetic film medium, because it increases in crystal magnetic anisotropy owing to the incorporation of Pt even if it is made into multi-layered thin film.

The multi-layered magnetic film medium ($Pd/CoCr_{21}Pt_{14}$ medium) in this example was examined for a relation between d1/d2 and recording noise. It was found that recording noise can be suppressed if d1/d2 is larger than 1.5 as in Example 1.

Figure 11:
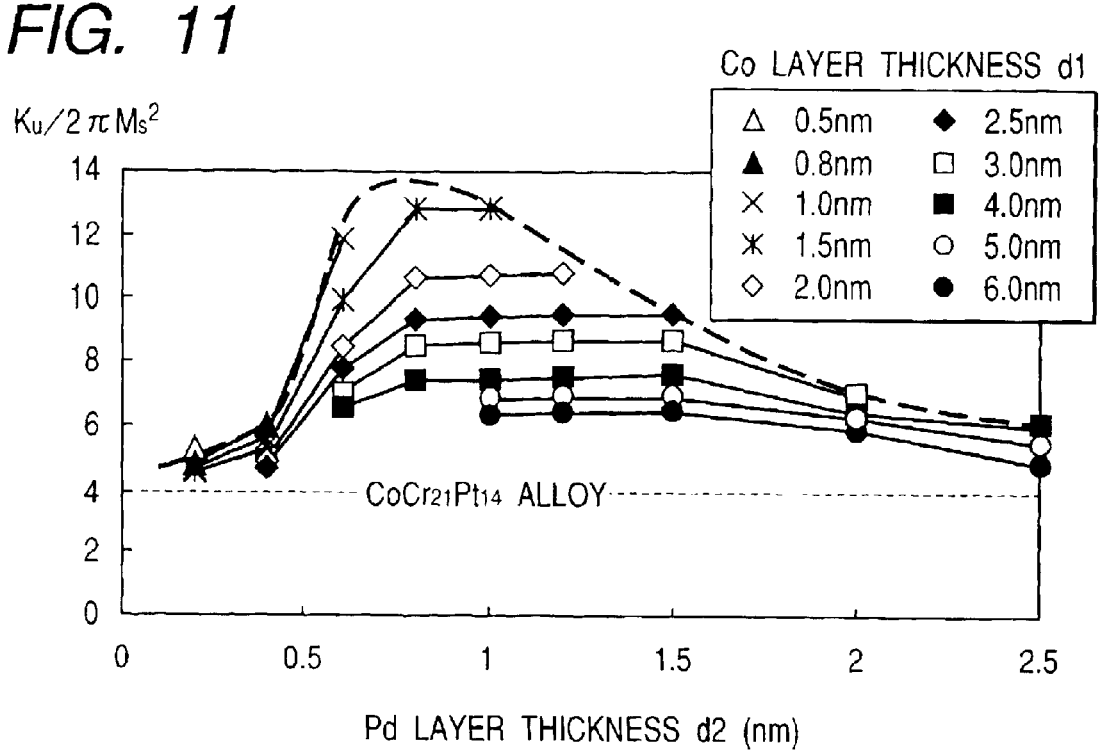
FIG. 11 shows how the thermal stability parameter $K_u/2\pi M_s^2$ depending on d1 and d2 in the magnetic recording medium of the Example 2.

Samples of $Pd/CoCr_{21}Pt_{14}$ medium varying in their layer thickness were measured for $K_u/2\pi M_s^2$ values. The results are shown in FIG. 11. In comparison of FIG. 11 with FIG. 7 (in term of the $Pd/CoCr_{21}$ medium), it is noted that the $Pd/CoCr_{21}Pt_{14}$ medium has larger $K_u/2\pi M^{s2}$ values than the $Pd/CoCr_{21}$ medium, with the maximum value being about 12 when d2 is in the range of 0.8 to 1.0 nm. It is also noted that the Pd noble metal layer should have a thickness (d2) larger than 0.6 nm so as to meet the condition that $K_u/2\pi M_s^2$ of the $CoCr_{15}Pt_{14}B_2$ alloy is greater than 6 (as the index for thermal stability). If the Pd alloy layer is excessively thick (or thicker than 2.0 nm), magnetic exchange interaction between CoCr-based alloy layers is insufficient, and hence CoCr-based alloy layers would have different coercive force independently.

Samples of $Pd/CoCr_{21}Pt_x$ medium were examined for perpendicular magnetic anisotropy, with the amount of Pt varying in the ferromagnetic metal layer of CoCr-based alloy. The $CoCr_{21}Pt_x$ alloy layer is 1.6 nm thick, and the Pd noble metal layer is 0.8 nm thick.

It was found that the perpendicular magnetic anisotropy energy linearly increases in proportion to the amount of Pt added (up to 10 at %). However, the perpendicular magnetic anisotropy remained almost unchanged beyond 10 at %, and recording noise begins to increase beyond 16 at %. This indicates that incorporation with Pt increases magnetic exchange interaction between particles. It is concluded from the foregoing that the ferromagnetic metal layer of CoCr-based alloy should be incorporated with Pt in an amount from 10 at % to 16 at %.

EXAMPLE 3

This example demonstrates a multi-layered magnetic film recording medium ("Pd/CoCr$_{15}$Pt$_{14}$B$_2$ medium" hereinafter) which was prepared in the following manner. First, a substrate was coated sequentially with an underlying layer (40 nm thick) of NiTa$_{37}$Zr$_{10}$ alloy and a Pd film (5 nm thick). With the substrate heated to 250° C., the Pd film was coated with an initial layer (3 nm thick) of CoCr$_{40}$ alloy and subsequently with a multi-layered magnetic film of Pd/CoCr$_{15}$Pt$_{14}$B$_2$ ("Pd/CoCr$_{15}$Pt$_{14}$B$_2$ film" hereinafter) by using the rotary cathode device. After the multi-layered magnetic film had been formed, a heat treatment was performed at 350° C. or above for 10 seconds. After cooling, a Pd film (1 nm thick) and a carbon protective film were formed sequentially.

In general, the crystal magnetic anisotropy energy (K$_v$) increases but the effect of reducing the magnetic exchange interaction between particles at Cr grain boundaries is lost as the Cr concentration decreases in the CoCr-based alloy. According to the conventional technology, the minimum Cr concentration was 20% which decreases the magnetic exchange interaction between particles without increase in recording noise.

The present inventors found that the magnetic exchange interaction between particles decreases to a level suitable for magnetic recording if heat treatment is performed at 350° C. or above for 10 seconds or so after the multi-layered magnetic film has been formed.

The reason why the magnetic exchange interaction between particles decreases upon a heat treatment may be understood as follows. The CoCr$_{40}$ initial layer just under the multi-layered magnetic film contains Cr atoms which, during reheating, diffuse through the grain boundaries of magnetic particles in the direction perpendicular to the film surface.

A comparative sample of single-layered magnetic film medium ("CoCr$_{15}$Pt$_{14}$B$_2$ medium" hereinafter) was prepared in the following manner. A substrate was coated sequentially with an underlying layer (40 nm thick) of NiTa$_{37}$Zr$_{10}$ alloy and a Pd film (5 nm thick). With the substrate heated to 250° C., the Pd film was coated with an initial layer (3 nm thick) of CoCr$_{40}$ alloy and subsequently with a single-layered magnetic film of CoCr$_{15}$Pt$_{14}$B$_2$ ("CoCr$_{15}$Pt$_{14}$B$_2$ film" hereinafter). After the CoCr$_{15}$Pt$_{14}$B$_2$ film had been formed, a heat treatment was performed at 350° C. or above for 10 seconds. After sufficient cooling, a Pd film (1 nm thick) and a carbon protective film were formed sequentially.

The CoCr$_{15}$Pt$_{14}$B$_2$ alloy film was found to have large perpendicular anisotropy energy of about 2.5×10$^5$ J/m$^3$ and saturation magnetization of 320 kA/m (which is larger than that of the CoCr$_{15}$ alloy film) due to the small Cr content (15%). Therefore, the recording medium has a large demagnetizing field, and the single-layered film of CoCr$_{15}$Pt$_{14}$B$_2$ has a K$_u$/2πM$_s^2$ value of 3.9. In other words, the single-layered film of CoCr$_{15}$Pt$_{14}$B$_2$ differs very little from the CoCr$_{21}$Pt$_{14}$ film with a large Cr content (without heat treatment, referred to Example 2) in terms of K$_u$/2πM$_s^2$ (thermal stability), because the increased perpendicular magnetic anisotropy is cancelled by the increased demagnetizing field.

The Pd/CoCr$_{15}$Pt$_{14}$B$_2$ medium, which underwent heat treatment after the multi-layered magnetic film had been formed, was examined for perpendicular magnetic anisotropy energy (K$_u$) and saturation magnetization (M$_s$), with the thickness of the multi-layered magnetic film being adequately varied. The results are shown in Tables 4 and 5.

TABLE 4

Structure and perpendicular magnetic anisotropy energy (K$_u$) of multi-layered magnetic film in Pd/CoCr$_{21}$Pt$_{14}$B$_4$ medium with reheating (unit: × 10$^5$ J/m$^3$)

| | | Thickness of Pd film (nm) | | | | | | |
|---|---|---|---|---|---|---|---|---|
| | | 0.2 | 0.4 | 0.6 | 0.8 | 1.0 | 1.2 | 1.5 |
| Thickness of | 0.3 | 2.02 | 2.92 | 5.56 | 6.87 | 6.45 | 5.72 | 4.75 |
| CoCr$_{21}$Pt$_{14}$B$_2$ | 0.5 | 1.98 | 2.65 | 5.43 | 6.15 | 5.92 | 5.30 | 4.67 |
| alloy film | 0.8 | 2.03 | 2.55 | 4.85 | 5.64 | 5.26 | 4.95 | 4.30 |
| (nm) | 1.0 | 2.15 | 2.42 | 4.35 | 5.45 | 4.98 | 4.75 | 4.05 |
| | 1.5 | 2.10 | 2.30 | 3.98 | 4.81 | 4.45 | 4.30 | 3.68 |
| | 2.0 | — | 2.32 | 3.78 | 4.33 | 4.07 | 3.77 | 3.30 |
| | 2.5 | — | 2.32 | 3.66 | 4.05 | 3.80 | 3.85 | 3.35 |
| | 3.0 | — | — | 3.42 | 3.75 | 3.58 | 3.42 | 3.32 |
| | 4.0 | — | — | 3.15 | 3.45 | 3.20 | 3.35 | 3.04 |
| | 5.0 | — | — | — | — | 3.25 | 3.05 | 3.12 |
| | 6.0 | — | — | — | — | 3.04 | 3.05 | 2.95 |

TABLE 5

Structure and saturation magnetization (M$_s$) of multi-layered magnetic film in Pd/CoCr$_{21}$Pt$_{14}$B$_4$ medium with reheating (unit: kA/m)

| | | Thickness of Pd film (nm) | | | | | | |
|---|---|---|---|---|---|---|---|---|
| | | 0.2 | 0.4 | 0.6 | 0.8 | 1.0 | 1.2 | 1.5 |
| Thickness of | 0.3 | 240 | 222 | 175 | 164 | 150 | 152 | 143 |
| CoCr$_{21}$Pt$_{14}$B$_2$ | 0.5 | 275 | 248 | 205 | 190 | 175 | 170 | 165 |
| alloy film | 0.8 | 284 | 268 | 231 | 215 | 210 | 195 | 167 |
| (nm) | 1.0 | 290 | 272 | 244 | 226 | 210 | 208 | 190 |
| | 1.5 | 298 | 280 | 270 | 250 | 237 | 226 | 220 |
| | 2.0 | — | 290 | 272 | 270 | 250 | 242 | 230 |
| | 2.5 | — | 300 | 285 | 268 | 265 | 256 | 243 |
| | 3.0 | — | — | 285 | 275 | 270 | 263 | 260 |
| | 4.0 | — | — | 296 | 295 | 280 | 270 | 262 |
| | 5.0 | — | — | — | — | 293 | 272 | 275 |
| | 6.0 | — | — | — | — | 295 | 292 | 284 |

It is noted from that the multi-layered magnetic film has higher values of both K$_u$ and K$_s$ as compared with that in Example 2 for the same layer thickness. On the other hand, the multi-layered magnetic film has larger surface magnetic anisotropy energy (K$_s$) as compared with that of Pd/CoCr$_{21}$ medium in Example 1 and that of Pd/CoCr$_{21}$Pt$_{14}$ medium in Example 2, both by more than 50%, for the same structure. This may be attributable to the increased Co concentration in the Co alloy layer and the increased area of Pd/Co interface.

Figure 12:
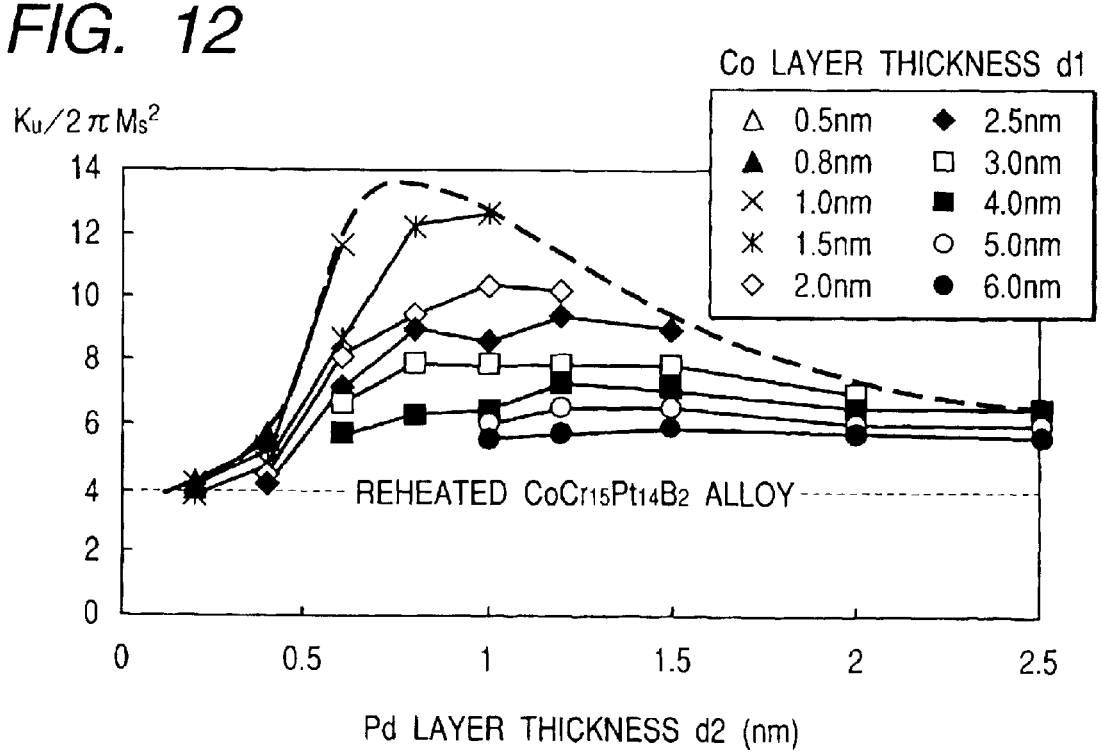
FIG. 12 shows how the thermal stability parameter $K_u/2\pi M_s^2$ depending on d1 and d2 in the magnetic recording medium of the Example 3.

As in Example 1 (FIG. 7) and Example 2 (FIG. 11), the K$_u$/2πM$_s^2$ values are plotted against d2, with d1 varied such that d1/d2 is greater than 1.5 (for sufficiently small magnetic exchange interaction between particles). The result is shown in FIG. 12. This result is quite similar to that in Example 2. However, the recording medium in this example has more preferable properties than that in Example 2. One of such properties is good thermal stability for high recording density.

What K$_u$/2πM$_s^2$ values represent is thermal stability which manifests itself when magnetization in the medium is oriented in the same direction or when the recording density is low. With a low recording density, the Pd/CoCr$_{15}$Pt$_{14}$B$_2$ medium in this example is almost identical in thermal stability to the medium in Example 2, due to the effect of the demagnetizing field. However, as the recording density increases, the medium in this example, which has a larger value of $K_u$, has the advantage in thermal stability. Another of the preferable properties is the high strength of reproduced signals. In other words, the Pd/CoCr$_{15}$Pt$_{14}$B$_2$ medium in this example has larger magnetization than the medium in Example 2, which provides a larger output of reproduced signals.

The present inventors closely studied heat treatment performed after the CoCr$_{15}$Pt$_{14}$B$_2$ film has been formed. It was found that reheating does not cut off the magnetic exchange interaction between particles in the multi-layered magnetic film if the Cr content is lower than 12 at %. This result suggests that it is necessary that the Cr content in the Co alloy should be higher than 12 at %.

It was found that Cu in place of Cr is also useful as the additive to the initial layer. The amount of Cu in the initial layer should be larger than that in the multi-layered magnetic film. An amount more than 30 at % is necessary for reheating to produce a remarkable effect.

In addition, this example is characterized by that the Co alloy is incorporated with a small amount (2 at %) of B. The incorporation of B reduces the size of magnetic particles by about 10%. It is known that, in general, such elements as B and Ta added in small quantities to the CoCr-based alloy promote segregation of Cr atoms on the grain boundary and reduce the size of crystal grains. It was confirmed that this is effective also in the multi-layered magnetic film medium. More details are discussed in Example 4.

EXAMPLE 4

This example demonstrates a multi-layered magnetic film recording medium of the same structure as in Example 1, except that the multi-layered film is incorporated with boron (B). This recording medium has a ferromagnetic metal layer of CoCr$_{21}$Pt$_{14}$B$_x$ (1.8 nm thick) and a noble metal layer of PdB$_x$ (0.8 nm thick). The multi-layered magnetic film has a total thickness of 20 nm.

The amount of B added is expressed in terms of x at %. The layers containing B were prepared in the same way as in Example 1. The substrate was heated to 250° C. after the underlying layer had been formed. With x varied from 0 at % to 5 at %, the multi-layered magnetic film was examined for magnetic properties and crystal grain sizes. The results are shown in Table 6. Incidentally, the measurements of crystal grain size were carried out by using a scanning tunnel electron microscope (TEM) and crystal structure analysis.

TABLE 6

Magnetic properties and crystal grain size of multi-layered magnetic thin film (20 nm thick) composed of PdB$_x$ (0.8 nm) and CoCr$_{21}$Pt$_{14}$B$_x$ (1.8 nm)

| Amount of B added (x at %) | Saturation magnetization (M$_s$) (kA/m) | Coercive force (H$_c$) (kA/m) | Perpendicular magnetic anisotropy energy (K$_u$) (J/m$^3$) | Crystal grain size (D) (nm) |
|---|---|---|---|---|
| 0 | 202 | 415 | 2.42 × 10$^5$ | 11.5 |
| 1 | 200 | 376 | 2.33 × 10$^5$ | 10.5 |
| 2 | 195 | 352 | 2.04 × 10$^5$ | 10.2 |
| 3.5 | 191 | 310 | 1.95 × 10$^5$ | 9.7 |
| 5 | 185 | 292 | 1.81 × 10$^5$ | 9.2 |

It is noted from Table 6 that the incorporation of B into the non-magnetic metal layer (Pd) slightly decreases the crystal grain size as well as $K_u$ and $H_c$. Because of the decrease in $K_u$ and the grain size, the perpendicular magnetic recording medium is subject to thermal disturbance and hence is poor in thermal stability. Nevertheless, it has a low level of recording noise owing to the reduction in grain size.

In this example, the incorporation of 5 at % B did not cause appreciable thermal demagnetization. Rather, the incorporation of B reduces the grain size and adjust $K_u$ and $M_s$ to adequate values suitable for perpendicular magnetic recording. This in turn improves resistance to thermal disturbance and contributes to the multi-layered magnetic film suitable for the perpendicular magnetic recording medium.

The same effect as mentioned above was also obtained when B was replaced by tantalum (Ta).

As mentioned above, the perpendicular magnetic recording medium consists of a substrate and a multi-layered magnetic film, with or without an underlying layer interposed between them. The multi-layered magnetic film is composed of ferromagnetic metal layers containing Co and non-magnetic metal layers containing Pd, each one layer of which are laminated alternately on top of one layer of the other. The ferromagnetic metal layers and the non-magnetic metal layers have a thickness of d1 and d2, respectively, with the ratio of d1/d2 being in the range of 1.5 to 4.0. This specific layer structure reduces the magnetic exchange interaction between magnetic particles in the magnetic recording film and increases the perpendicular magnetic anisotropy energy ($K_u$) relative to the demagnetizing field of the recording medium. As a result, the perpendicular magnetic recording medium is stable against thermal disturbance and has a low level of recording noise.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A perpendicular magnetic recording medium having a substrate, a multi-layered magnetic film formed thereon with or without an underlying layer interposed therebetween, said multi-layered magnetic film being composed of an initial layer of Co alloy containing more than 30 at % of Cr or Cu and being formed on one side of the multi-layered magnetic film which faces the substrate, ferromagnetic metal layers containing Co and less than 20 at % of Cr, and non-magnetic metal layers containing mainly of Pd each of which is laminated alternately on top of one of the ferromagnetic metal layers, wherein a ratio of film thickness is defined by d1/d2 ranges from 1.5 to 4.0, d1 denotes a thickness of each of said ferromagnetic metal layers and d2 denotes a thickness of each of said non-magnetic metal layers and d2 ranges from 0nm to 2.0 nm.

2. The perpendicular magnetic recording medium as defined in claim 1, wherein d2 ranges from 0.8 nm to 1.2 nm.

3. The perpendicular magnetic recording medium as defined in claim 1, further has a carbon protective film formed on said multi-layered magnetic film.

4. The perpendicular magnetic recording medium as defined in claim 1, wherein interface positions of the ferromagnetic metal layers and the non-magnetic metal layers periodically moves.

5. The perpendicular magnetic recording medium as defined in claim 1, wherein the initial layer is about 3 nm thick.

6. The perpendicular magnetic recording medium as defined in claim 1, wherein the ferromagnetic metal layers contain Pt.

7. The perpendicular magnetic recording medium as defined in claim 6, wherein the ferromagnetic metal layers contain at least 12 at % of Cr and 10 at % to 16 at % of Pt.

8. The perpendicular magnetic recording medium as defined in claim 1, wherein at least one group of layers of the ferromagnetic metal layers and the non-magnetic metal layers contain B or Ta.

9. The perpendicular magnetic recording medium as defined in claim 8, wherein each of the ferromagnetic metal layers contains no more than 2 at % of B.

10. The perpendicular magnetic recording medium as defined in claim 8, wherein each of the non-magnetic metal layers contains no more than 5 at % of B.

11. A process for producing a perpendicular magnetic recording medium, comprising:

forming an underlying layer on a substrate; and forming on said underlying layer a multi-layered magnetic film composed of an initial layer of Co alloy containing more than 30 at % of Cr or Cu and being formed on one side of the multi-layered magnetic film which faces the substrate, ferromagnetic metal layers containing Co and less than 20 at % of Cr, and non-magnetic metal layers containing mainly of Pd each of which is laminated alternately on top of one of the ferromagnetic metal layers, wherein a ratio of film thickness defined by d1/d2 ranges from 1.5 to 4.0, d1 denotes a thickness of each of said ferromagnetic metal layers and d2 denotes a thickness of each of said non-magnetic metal layers, and d2 ranges from 0.6 nm to 2.0 nm.

12. The process for producing a perpendicular magnetic recording medium as defined in claim 11, wherein the ferromagnetic metal layers contain at least 12 at % of Cr.

13. The process for producing a perpendicular magnetic recording medium as defined in claim 12, wherein wherein the ferromagnetic metal layers contain 10 at % to 16 at % of Pt.

14. The process for producing a perpendicular magnetic recording medium as defined in claim 12, further comprising a step of heat treatment in a vacuum at a temperature higher than 350° C. which is performed after the multi-layered magnetic film has been formed.

15. The process for producing a perpendicular magnetic recording medium according to claim 11, wherein the multi-layered magnetic film forming step involves discharging at least two target cathodes simultaneously or alternately.

16. The process for producing a perpendicular magnetic recording medium according to claim 11, wherein said at least two target cathodes are mounted on a rotary platform at a same height.

\* \* \* \* \*